United States Patent
McLean

(10) Patent No.: US 11,973,774 B2
(45) Date of Patent: Apr. 30, 2024

(54) MULTI-STAGE ANOMALY DETECTION FOR PROCESS CHAINS IN MULTI-HOST ENVIRONMENTS

(71) Applicant: Darktrace Holdings Limited, Cambridge (GB)

(72) Inventor: Euan Miller McLean, Glasgow (GB)

(73) Assignee: Darktrace Holdings Limited, Cambridge (GB)

( * ) Notice: Subject to any disclaimer, the term of this patent is extended or adjusted under 35 U.S.C. 154(b) by 515 days.

(21) Appl. No.: 17/187,192

(22) Filed: Feb. 26, 2021

(65) Prior Publication Data
US 2021/0273958 A1 Sep. 2, 2021

Related U.S. Application Data

(60) Provisional application No. 62/983,307, filed on Feb. 28, 2020.

(51) Int. Cl.
*H04L 9/40* (2022.01)
*G06N 3/049* (2023.01)
(Continued)

(52) U.S. Cl.
CPC ......... *H04L 63/1425* (2013.01); *G06N 3/049* (2013.01); *G06N 7/01* (2023.01);
(Continued)

(58) Field of Classification Search
CPC ............. H04L 63/1425; H04L 63/1416; H04L 63/1433; G06N 20/00; G06N 7/01; G06N 3/049
See application file for complete search history.

(56) References Cited

U.S. PATENT DOCUMENTS 6,154,844 A 11/2000 Touboul et al.
6,965,968 B1 11/2005 Touboul
(Continued)

FOREIGN PATENT DOCUMENTS

EP 2922268 A1 9/2015
WO 2001031420 A2 5/2001
(Continued)

OTHER PUBLICATIONS

Gharan, Shayan Oveis, "Lecture 11; Clustering and the Spectral Partitioning Algorithm" May 2, 2016, 6 pages.
(Continued)

*Primary Examiner* — Lynn D Feild
*Assistant Examiner* — Saad Ahmad Abdullah
(74) *Attorney, Agent, or Firm* — Rutan and Tucker, LLP

(57) ABSTRACT

A multi-stage anomaly detector analyzes an anomalous process chain in real time and rapidly determines whether the process chain is indicative of a cyber threat on an endpoint computing device in a multi-host environment. The multi-stage anomaly detector is used in an analyzer module configured within a host endpoint agent on that device. The analyzer module generates an anomaly score to correlate a likelihood that the cyber threat detected is harmful to that device. The multi-stage anomaly detector includes multiple stages of anomaly detectors including a first stage, a second stage, and a third stage of the anomaly detectors. Each stage generates its own anomaly score to produce at least one rapidly determined anomaly score as well as one thoroughly determined anomaly score. Each anomaly score is generated from various computational processes and factors different from the computational processes and factors of the other stages of anomaly detectors.

22 Claims, 8 Drawing Sheets

(51) Int. Cl.
    *G06N 7/01* (2023.01)
    *G06N 20/00* (2019.01)

(52) U.S. Cl.
    CPC ......... *G06N 20/00* (2019.01); *H04L 63/1416* (2013.01); *H04L 63/1433* (2013.01)

(56) References Cited

U.S. PATENT DOCUMENTS

| | | |
|---|---|---|
| 7,307,999 B1 | 12/2007 | Donaghey |
| 7,418,731 B2 | 8/2008 | Touboul |
| 7,448,084 B1 | 11/2008 | Apap et al. |
| 7,890,869 B1 | 2/2011 | Mayer et al. |
| 8,312,540 B1 | 11/2012 | Kahn et al. |
| 8,661,538 B2 | 2/2014 | Cohen-Ganor et al. |
| 8,819,803 B1 | 8/2014 | Richards et al. |
| 8,879,803 B2 | 11/2014 | Ukil et al. |
| 8,966,036 B1 | 2/2015 | Asgekar et al. |
| 9,043,905 B1 | 5/2015 | Allen et al. |
| 9,106,687 B1 | 8/2015 | Sawhney et al. |
| 9,185,095 B1 | 11/2015 | Moritz et al. |
| 9,213,990 B2 | 12/2015 | Adjaoute |
| 9,348,742 B1 | 5/2016 | Brezinski |
| 9,401,925 B1 | 7/2016 | Guo et al. |
| 9,516,039 B1 | 12/2016 | Yen et al. |
| 9,516,053 B1 | 12/2016 | Muddu et al. |
| 9,641,544 B1 | 5/2017 | Treat et al. |
| 9,712,548 B2 | 7/2017 | Shmueli et al. |
| 9,727,723 B1 | 8/2017 | Kondaveeti et al. |
| 10,237,298 B1 | 3/2019 | Nguyen et al. |
| 10,268,821 B2 | 4/2019 | Stockdale et al. |
| 10,419,466 B2 | 9/2019 | Ferguson et al. |
| 10,516,693 B2 | 12/2019 | Stockdale et al. |
| 10,673,880 B1* | 6/2020 | Pratt .................. H04L 63/1433 |
| 10,701,093 B2 | 6/2020 | Dean et al. |
| 2002/0174217 A1 | 11/2002 | Anderson et al. |
| 2002/0186698 A1 | 12/2002 | Ceniza |
| 2003/0070003 A1 | 4/2003 | Chong et al. |
| 2004/0083129 A1 | 4/2004 | Herz |
| 2004/0167893 A1 | 8/2004 | Matsunaga et al. |
| 2005/0065754 A1 | 3/2005 | Schaf et al. |
| 2007/0118909 A1 | 5/2007 | Hertzog et al. |
| 2007/0294187 A1 | 12/2007 | Scherrer |
| 2008/0005137 A1 | 1/2008 | Surendran et al. |
| 2008/0077358 A1 | 3/2008 | Marvasti |
| 2008/0109730 A1 | 5/2008 | Coffman et al. |
| 2008/0155517 A1* | 6/2008 | Yan .................... G06F 11/3466 |
| | | 714/E11.179 |
| 2009/0106174 A1 | 4/2009 | Battisha et al. |
| 2009/0254971 A1 | 10/2009 | Herz et al. |
| 2010/0009357 A1 | 1/2010 | Nevins et al. |
| 2010/0095354 A1 | 4/2010 | Gillum et al. |
| 2010/0107254 A1 | 4/2010 | Elland et al. |
| 2010/0125908 A1 | 5/2010 | Kudo |
| 2010/0235908 A1 | 9/2010 | Eynon et al. |
| 2010/0299292 A1 | 11/2010 | Collazo |
| 2011/0093428 A1 | 4/2011 | Wisse |
| 2011/0213742 A1 | 9/2011 | Lemmond et al. |
| 2011/0261710 A1 | 10/2011 | Chen et al. |
| 2012/0096549 A1 | 4/2012 | Amini et al. |
| 2012/0137367 A1 | 5/2012 | Dupont et al. |
| 2012/0192003 A1* | 7/2012 | Akiyama ............ G06F 11/3055 |
| | | 713/340 |
| 2012/0209575 A1 | 8/2012 | Barbat et al. |
| 2012/0210388 A1 | 8/2012 | Kolishchak |
| 2012/0284791 A1 | 11/2012 | Miller et al. |
| 2012/0304288 A1 | 11/2012 | Wright et al. |
| 2013/0091539 A1 | 4/2013 | Khurana et al. |
| 2013/0198119 A1 | 8/2013 | Eberhardt, III et al. |
| 2013/0198840 A1 | 8/2013 | Drissi et al. |
| 2013/0254885 A1 | 9/2013 | Devost |
| 2014/0007237 A1 | 1/2014 | Wright et al. |
| 2014/0074762 A1 | 3/2014 | Campbell |
| 2014/0165207 A1 | 6/2014 | Engel et al. |
| 2014/0215618 A1 | 7/2014 | Amit |
| 2014/0325643 A1 | 10/2014 | Bart et al. |
| 2015/0067835 A1 | 3/2015 | Chari et al. |
| 2015/0081431 A1 | 3/2015 | Akahoshi et al. |
| 2015/0161394 A1* | 6/2015 | Ferragut ............... H04L 9/3273 |
| | | 726/25 |
| 2015/0163121 A1 | 6/2015 | Mahaffey et al. |
| 2015/0172300 A1 | 6/2015 | Cochenour |
| 2015/0180893 A1 | 6/2015 | Im et al. |
| 2015/0213358 A1 | 7/2015 | Shelton et al. |
| 2015/0286819 A1 | 10/2015 | Coden et al. |
| 2015/0310195 A1 | 10/2015 | Bailor et al. |
| 2015/0319185 A1 | 11/2015 | Kirti et al. |
| 2015/0341379 A1 | 11/2015 | Lefebvre et al. |
| 2015/0363699 A1 | 12/2015 | Nikovski |
| 2015/0379110 A1 | 12/2015 | Marvasti et al. |
| 2016/0062950 A1 | 3/2016 | Brodersen et al. |
| 2016/0078365 A1 | 3/2016 | Baumard |
| 2016/0149941 A1 | 5/2016 | Thakur et al. |
| 2016/0164902 A1 | 6/2016 | Moore |
| 2016/0173509 A1 | 6/2016 | Ray et al. |
| 2016/0234241 A1* | 8/2016 | Talamanchi .......... G06F 21/552 |
| 2016/0241576 A1 | 8/2016 | Rathod et al. |
| 2016/0352768 A1 | 12/2016 | Lefebvre et al. |
| 2016/0359695 A1 | 12/2016 | Yadav et al. |
| 2016/0373476 A1 | 12/2016 | Dell'Anno et al. |
| 2017/0054745 A1 | 2/2017 | Zhang et al. |
| 2017/0063907 A1 | 3/2017 | Muddu et al. |
| 2017/0063910 A1 | 3/2017 | Muddu et al. |
| 2017/0063911 A1 | 3/2017 | Muddu et al. |
| 2017/0169360 A1 | 6/2017 | Veeramachaneni et al. |
| 2017/0270422 A1 | 9/2017 | Sorakado |
| 2018/0027006 A1 | 1/2018 | Zimmermann et al. |
| 2018/0167402 A1 | 6/2018 | Scheidler et al. |
| 2018/0183680 A1* | 6/2018 | Chen .................. H04L 63/1425 |
| 2019/0036948 A1 | 1/2019 | Appel et al. |
| 2019/0044963 A1 | 2/2019 | Rajasekharan et al. |
| 2019/0251260 A1 | 8/2019 | Stockdale et al. |
| 2019/0253447 A1* | 8/2019 | Sweeney ................ H04L 63/14 |
| 2020/0280575 A1 | 9/2020 | Dean et al. |
| 2021/0120027 A1 | 4/2021 | Dean et al. |
| 2021/0157919 A1 | 5/2021 | Stockdale et al. |

FOREIGN PATENT DOCUMENTS

| | | |
|---|---|---|
| WO | 2008121945 A2 | 10/2008 |
| WO | 2013053407 A1 | 4/2013 |
| WO | 2014088912 A1 | 6/2014 |
| WO | 2015027828 A1 | 3/2015 |
| WO | 2016020660 A1 | 2/2016 |
| WO | 2019243579 A1 | 12/2019 |
| WO | 2020021100 A1 | 1/2020 |

OTHER PUBLICATIONS

Nikolystylfw, "Can Senseon beat Darktrace at its very own game with its 'An I triangulation' modern technology?" Dec. 22, 2018, nikolystylfw.

Lunden, Ingrid, "Senseon raises $6.4M to tackle cybersecurity threats with an AI 'triangulation' approach" Feb. 19, 2019, Tech Crunch.

Senseon Tech Ltd., "The State of Cyber Security SME Report 2019" Jun. 3, 2019, 16 pages.

Caithness, Neil, "Supervised/unsupervised cross-over method for autonomous anomaly classification," Oct. 25, 2019, CAMLIS 2019.

Senseon Tech Ltd., "Technology," * please see the statement filed herewith.

Senseon Tech Ltd., "Senseon & You," * please see the statement filed herewith.

Senseon Tech Ltd., "Technology Overview," * please see the statement filed herewith.

Senseon Tech Ltd., "Senseon Enterprise," * please see the statement filed herewith.

Senseon Tech Ltd., "Senseon Pro," * please see the statement filed herewith.

Senseon Tech Ltd., "Senseon Reflex," * please see the statement filed herewith.

(56) References Cited

OTHER PUBLICATIONS

Abdallah Abbey Sebyala et al., "Active Platform Security through Intrusion Detection Using Naive Bayesian Network for Anomaly Detection," Department of Electronic and Electrical Engineering, 5 pages, University College London, Torrington Place, England, United Kingdom.

Marek Zachara et al., "Detecting Unusual User Behavior to Identify Hijacked Internet Auctions Accounts," Lecture Notes in Computer Science, 2012, vol. 7465, Springer, Berlin, Heidelberg, Germany.

* cited by examiner

MULTI-STAGE ANOMALY DETECTION FOR PROCESS CHAINS IN MULTI-HOST ENVIRONMENTS

RELATED APPLICATION

This application claims priority to and the benefit of under 35 USC 119 of U.S. provisional patent application titled "An artificial intelligence based cyber security system," filed Feb. 28, 2020, application No. 62/983,307, which is incorporated herein by reference in its entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Embodiments of the design provided herein generally relate to a cyber security detection system. In several embodiments, one or more artificial Intelligence (AI) processes may be implemented with multi-stage anomaly detectors to detect anomalous process chains in multi-host environments.

BACKGROUND

In a cyber security environment, firewalls, endpoint security methods, and other detection and defense tools may be deployed to enforce specific policies and provide protection against certain threats on such environment. These tools currently form an important part of an organization's cyber defense strategy, but they are insufficient in the new age of cyber threat. Legacy tools are failing to deal with new cyber threats because the traditional approach relies on being able to predefine the cyber threat in advance, by writing rules or producing signatures. In today's environment, this approach to defend against new-age cyber threats is fundamentally flawed for several reasons. One reason this approach does not protect against such threats is that these new-age cyber threats are constantly evolving, as such novel attacks do not match historical-attack "signatures," and even subtle changes to previously understood attacks and/or produced signatures may result in them going undetected by legacy defenses. Another reason is that the rules and policies being defined by the organizations are continually insufficient, such that security teams and/or other legacy tools cannot simply imagine and predefine every possible thing that may go wrong in the future. The last major reason this approach does not protect against such threats is that employee 'insider' threats are an ever-growing trend, meanwhile it is very difficult to spot malicious employees behaving inappropriately as they are integral to such environment.

The reality is that modern threats bypass the traditional legacy defense tools on a daily basis. These tools need a new tool based on a new approach that may complement them and mitigate their deficiencies at scale across the entirety of digital organizations. In the complex modern world, it is advantageous that the approach is fully automated as it is virtually impossible for humans to sift through the vast amount of security information gathered each minute within a digital business. For example, a real-time threat detection system having autonomous responses with definitive network and/or endpoint evidence to enables rapid threat investigation and remediation is needed. A system that gives the ability to deploy instances of a host agent in a computing device to extend the system's powerful threat detection and response across the network is needed. Where it is not possible to deploy a new endpoint host agent, a universal communication method is needed to utilize existing third-party logging and endpoint tools on an endpoint computing device.

In particular, a detection system that may detect anomalies with less computations and be able to handle higher throughput events, without missing any possible subtle and/or fast-occurring anomalies, is needed. Such that the detection system may be used to solve real-time problems rather than the existing detection systems that are using historical data, predefined signatures, and so on, to identify cyber threats at their own allotted time duration. In addition, such that the detection system may be capable of identifying any unusual processes on an endpoint device using the pattern of life on that device without requiring predefined malware signatures from other endpoint devices.

SUMMARY

In an embodiment, a host endpoint agent may be configured to detect one or more potential cyber threats on an endpoint computing device. In some embodiments, the host endpoint agent may have an analyzer module cooperating with one or more other modules that reside on the endpoint computing device. In other embodiments, the host endpoint agent may be communicatively coupled to an analyzer module residing on an external computing device (e.g., a cloud-based server and/or the like), as described below in greater detail.

The analyzer module may be configured to generate one or more anomaly scores for a cyber threat detected in a cyber threat security platform on the host endpoint agent. The detected cyber threat under analysis by the analyzer module may include one or more process chains. The analyzer module may include a multi-stage anomaly detector where the multi-stage anomaly detector includes two or more stages of anomaly detectors. Each stage of the anomaly detectors may generate a particular anomaly score from the one or more generated anomaly scores for a process chain of parameters under analysis by that stage of the multi-stage anomaly detector. Thus, each particular anomaly score may be generated based on one or more data parameters.

Furthermore, in an embodiment, the analyzer module may use the multi-stage anomaly detector to generate a combined anomaly score. The combined anomaly score may be generated based on a weighted combination of each of the particular anomaly scores generated with the each of the stages of the anomaly detectors. The combined anomaly score may correlate to a likelihood that the detected cyber threat is maliciously harmful for the endpoint computing device.

In another embodiment, the analyzer module may receive a real-time input signal of the detected cyber threat and respectively responds with a real-time output signal based on the combined anomaly score and/or the correlated likelihood that the detected cyber threat is maliciously harmful for the endpoint computing device. The real-time input signal may have a timestamp that is substantially equal to a timestamp of the real-time output signal.

The combined anomaly score may be determined based on one or more interest-level factors comprising at least a level of interest factor and/or an estimation level of severeness factor. For example, the host endpoint agent may be configured to use one or more machine-learning models trained on the endpoint computing device to analyze a collected pattern of life data for the endpoint computing device against a normal pattern of life data for the endpoint computing device to provide the determination of the combined anomaly score for the detected cyber threat on that device. The level of interest factor may be used to determine how much a behavior pattern of the detected cyber threat is different from a normal behavior pattern of life for the endpoint computing device, whereas the estimation level of severeness factor may be used to determine an estimation on the severeness of a potential threat impact on the endpoint computing device and one or more peer group computing devices based on the determined behavior pattern for the detected cyber threat.

In several embodiments, the one or more stages of the anomaly detectors of the multi-stage anomaly detector of the analyzer module may include a first stage of the anomaly detectors, a second stage of the anomaly detectors, and/or a third stage of the anomaly detectors. Each stage of the anomaly detectors may be configured to use one or more computational processes and factors that are different from the one or more computational process used by the other stages of the anomaly detectors, where the one or more different computational processes and factors may be used to compute the weighted combination of the generated particular anomaly scores to thereby provide at least one or more rapidly determined anomaly scores in conjunction with one or more thoroughly determined anomaly scores.

These and other features of the design provided herein may be better understood with reference to the drawings, description, and claims, all of which form the disclosure of this patent application.

BRIEF DESCRIPTION OF DRAWINGS

The above, and other, aspects, features, and advantages of several embodiments of the present disclosure will be more apparent from the following description as presented in conjunction with the following several figures of the drawings. The drawings refer to embodiments of the present disclosure in which.

Figure 1:
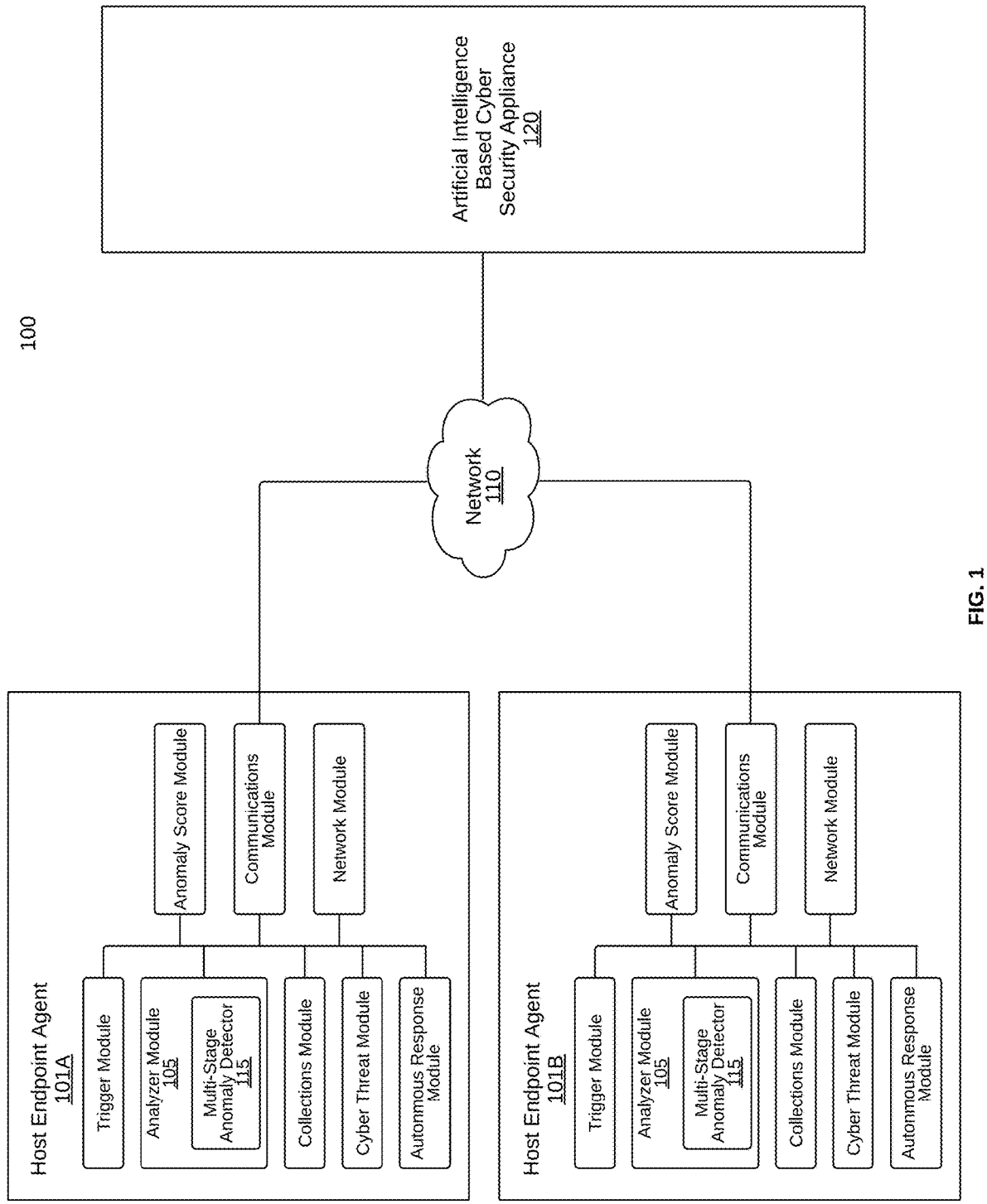
FIG. 1 illustrates a block diagram of an AI based cyber security system having one or more host endpoint agents configured to cooperate with an AI based cyber security appliance to detect anomalous process chains on one or more endpoint computing devices, in accordance with an embodiment of the disclosure.

While the design is subject to various modifications, equivalents, and alternative forms, specific embodiments thereof have been shown byway of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design may be practiced without these specific details. In other instances, well known components or methods have not been described in detail but rather in a block diagram in order to avoid unnecessarily obscuring the present design. Further, specific numeric references such as a first server, may be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details may be varied from and still be contemplated to be within the spirit and scope of the present design. The term coupled is defined as meaning connected either directly to the component or indirectly to the component through another component.

In general, the embodiments described herein include a multi-stage anomaly detector in an analyzer module that may use artificial intelligence (AI) to analyze cyber security threats and anomalous processes in real time in a multi-host environment. The analyzer module may generate an anomaly score for an anomalous process chain for an AI based cyber threat security platform on a host endpoint agent. The multi-stage anomaly detector may include various stages of anomaly detectors. The various stages may include a first stage of the anomaly detector, a second stage of the anomaly detector, and/or a third stage of the anomaly detector. Each stage of the multi stage anomaly detector generates its own anomaly score to produce at least one or more rapidly determined anomaly scores as well as one or more thoroughly determined anomaly scores. Each of the anomaly scores may be generated based on one or more computational processes and factors that are different from the computational processes and factors used by the other stages of the anomaly detector. Each stage of the multi-stage anomaly detector has a different amount of time duration in order to produce its anomaly score, in which the time duration differs from another stage of the multi-stage anomaly detector.

As used herein, the host endpoint agent may be configured in conjunction with the analyzer module to detect one or more potential cyber threats on an endpoint computing device. Accordingly, as used herein, the host endpoint agent: (i) may include an analyzer module cooperating with one or more other modules of the host endpoint agent, where most of (or all) the modules may reside on the endpoint computing device, according to several embodiments; and/or (ii) may be communicatively coupled to an analyzer module that resides on an external computing device such as a cloud-based server (and/or the like), where the analyzer module (e.g., with the multi-stage anomaly detector) may be implemented on the external cloud-based server, according to other embodiments. That is, as used herein in accordance to those embodiments, the external cloud-based server may be configured to serve that host endpoint agent and any other host endpoint agents, for example, for a discrete organization and/or the like, where the cloud-based server may (i) receive traffic information from each agent, and (ii) maintain individual models for each agent, as well as peer group models across a number of agents.

Furthermore, the host endpoint agent collaborates with an AI based cyber security appliance to detect the cyber security threats, such as the anomalous process chains, in real time on an endpoint computing device. The host endpoint agent analyzes to detect one or more potential cyber threats on the endpoint computing device. The host endpoint agent on the endpoint computing device may have a communications module that communicates with the AI based cyber security appliance and/or any other host peer devices over a network. The host endpoint agent may use a network module in conjunction with a collections module to discretely monitor and collect pattern of life data on each of the process chains executed on the endpoint computing device. The AI based cyber security appliance may include at least one or more AI and machine learning models to train and analyze the pattern of life data for each host endpoint agent communicatively coupled to that AI based cyber security appliance. Based upon an analysis of this pattern of life data, the one or more host endpoint agents may cooperate with the AI based cyber security appliance to trigger one or more actions to be autonomously taken through that particular host endpoint agent to contain an unusual behavior under analysis, when the generated anomaly score of the anomalous process chain of such behavior is indicative of a likelihood of a cyber threat that is equal to or above an actionable predetermined threshold.

Referring now to FIG. 1, an AI based cyber threat security system 100 having one or more host endpoint agents 101A-B configured to cooperate with an AI based cyber security appliance 120 over a network 110 is shown, in accordance with an embodiment of the disclosure. For example, the host endpoint agents 101A-B may be communicatively coupled to the AI based cyber security appliance 120 via the network 110. In most embodiments, each of the host endpoint agents 101A-B may be resident on its own respective endpoint computing device (e.g., as shown with the host endpoint agents 101A-B on the endpoint computing devices 201A-B in FIG. 2).

The endpoint devices may include, but are not limited to, a mobile phone, a tablet, a laptop, a desktop, Internet of Things (IoT) appliance, and so on. Moreover, the endpoint computing devices may be any variety of computing devices capable of cooperating with the host endpoint agents 101A-B over the network 110. For example, the network 110 may be implemented as an informational technology network, an operational technology network, a cloud infrastructure, a SaaS infrastructure, a combination thereof, and/or any other type of network capable of communicatively coupling/connecting the endpoint computing devices with each other. The network 110 may also include one or more networks selected from, but not limited to, an optical network, a cellular network, the Internet, a Local Area Network (LAN), a Wide Area Network (WAN), a satellite network, a cloud-based network, a fiber network, a cable network, any combinations thereof, and/or any other communications network capable of communicatively coupling (and/or connecting) the one or more host endpoint agents 101A-B to the AI based cyber security appliance 120. For example, the network 110 may be the Internet.

In several embodiments, the host endpoint agent 101A may be configured to operate substantially similar to the host endpoint agent 101B. However, in other embodiments, the host endpoint agent 101A may be configured to operate different from the host endpoint agent 101B based on, for example, varying user roles, user permissions, hierarchy relationships, peer groups, and so on. The host endpoint agents 101A-B may include multiple modules configured to cooperate with each other. For example, the modules of the host endpoint agents 101A-B may include, but are not limited to, a trigger module, a collections module, a cyber threat module, an autonomous response module, an anomaly score module, a communications module, a network module, and/or an analyzer module 105 with a multi-stage anomaly detector 115.

Similarly, the AI based cyber security appliance 120 may include multiple modules configured to cooperate with each other in conjunction with the modules of the host endpoint agents 101A-B. Furthermore, as described below in greater detail in FIG. 3, the AI based cyber security appliance 120 may include several modules that are substantially similar to the modules of the host endpoint agents 101A-B. Such modules of the AI based cyber security appliance 120 may be used to: (i) gather/collect data from the host endpoint agents 101A-B and its associated endpoint computing devices and users, (ii) analyze and score the gathered data, (iii) train AI and/or machine learning model(s) with the analyzed/scored data, (iv) determine, if any, autonomous response(s) based on the comparison between the analyzed/scored data and the trained data, (v) trigger the determined autonomous response(s), if any, directly on the respective host endpoint agent 101A-B, and (vi) communicate those triggered response(s), if any, with the users associated with that respective host endpoint agent 101A-B. Whereas, other modules of the AI based cyber security appliance 120 may be used to display data and metrics regarding the host endpoint agents 101A-B residing on the respective local endpoint computing devices, unify translated data from any of the host endpoint agents 101A-B, and so on.

The AI based cyber security appliance 120 may be configured with various modules that reference at least one or more AI and/or machine learning models (e.g., as shown with the AI models depicted in FIG. 3), which may be trained on any of the normal pattern of life, potential cyber threats, host endpoint agents, and network pattern of life observed from various entities in order to protect such entities from any cyber threats within the AI based cyber threat security system 100. As such, the AI based cyber security appliance 120 may cooperate with multiple (or all) modules and/or instances of the host endpoint agents 101A-B to defend any of the endpoint computing devices, its users, and/or local networks that are communicatively coupled to the network 110. For example, the AI based cyber security appliance 120 may use the at least one or more AI/machine learning models to analyze the pattern of life data for each host endpoint agent 101A-B, where each host endpoint agent 101A-B may be communicatively connected to one or more application programming interfaces (APIs) hosted by the AI based cyber security appliance 120. This allows the AI based cyber security appliance 120 to implement those AI/machine learning models trained on the respective endpoint computing devices to (i) analyze the collected pattern of life data for the respective host endpoint agent 101A-B connected to the respective API hosted by the AI based cyber security appliance 120, and (ii) compare that analyzed pattern of life data against a normal pattern of life observed for that respective endpoint computing device. Accordingly, this cooperation between the AI based cyber security appliance 120 and the host endpoint agents 101A-B residing on those endpoint computing devices may be used to protect against any unusual cyber security threats that may arise from maliciously harming networks as well as from maliciously harming anomalous process chains and so on.

For example, as shown in FIG. 1, any of the modules in the host endpoint agents 101A-B may be particularly configured to cooperate with each other to ultimately detect and analyze in real time any maliciously harming anomalous processes/process chains detected on their respective endpoint devices. As used herein, in real time may refer to a real time analysis of observed data that is being analyzed instantaneously and/or in a substantially instantaneous period of time. This observed data may include any variety of data analysis processes associated with any of the anomalous process chains that are detected with any of the host endpoint agents 101A-B on the respective endpoint computing devices in the AI based cyber threat security system 100. As such, these modules may be configured by the their respective host endpoint agent 101A-B to cooperate with one another in order to discretely detect and analyze in real time any anomalous process chains executed on their respective endpoint computing device. This detection and analysis of anomalous process chains in the AI based cyber threat security system 100 thereby enables the host endpoint agents 101A-B in conjunction with the AI based cyber security appliance 120 to be improved with (i) substantially faster interaction and response times (e.g., a Gigahertz transaction time compared to a network transaction time) and (ii) substantially augmented recurrent neural networks (or the like).

As used herein, an anomalous process may refer to a symbol, a token, a word, and/or any other unique data identifier used to identify an executable program (or process) with any of the respective host endpoint agents 101A-B. That is, the identifier is used to identify the process itself, where a path to the executable is used as an identifier for that process. However, the identifier does not have to relate to the path and may instead, for example, be related to the executable name, publisher, and/or the like. For example, the anomalous process may be classified with a unique identifier (UID) name formed from the specific resolvable path of the specific executable program it corresponds to. Additionally, in these examples, the UID name may include (i) a UID directory name to identify a specific location of a specific directory that contains that specific executable program in conjunction with (ii) a UID name to identify that specific executable program. Correspondingly, as used herein, a process chain (or an anomalous process chain) may refer to a chain or string of anomalous processes (i.e., a chain of symbols, tokens, words, etc.) that are discretely observed with the respective host endpoint agents 101A-B.

In several embodiments, the host endpoint agent 101A-B may use the analyzer module 105 to detect any anomalies in any of the observed process chains by identifying the specific path to the specific program executed on that specific endpoint computing device. For example, the analyzer module 105 may predict what anomalous process(es) may proceed from a detected process or process chain by specifically (or purely) looking at the previous frequencies of that process chain as specifically observed and trained with that host endpoint agent 101A-B on that endpoint computing device. This allows the analyzer module 105 to provide real-time assessments of any detected anomalous process chains, without requiring any malware signatures (or the like) to be gathered from any external devices, appliances, platforms/systems, etc., in order to provide such assessments for such process chains.

Furthermore, the analyzer module 105 in conjunction with any of the other modules may be used to discretely train the particular host endpoint agent 101A-B on all the particular behavior and pattern of life observed for that particular endpoint computing device, which includes any particular network, data, and/or user activities associated with that device as well as any previously observed and assessed anomalous process chains. For example, the analyzer module 105 may be configured to cooperate with at least one or more of the collections module and network module (or any of the other modules) to: (i) initially build-up a training corpus for a neural network (or the like) until it satisfies a predetermined threshold of observed data, including data observed from various behavioral patterns, network and data processes, user activities, anomalous process chains, and so on; (ii) continually generate a discrete vocabulary from that built-up training corpus (i.e., the vocabulary is personalized entirely from the pattern of life observed on that endpoint computing device and its peer group), and (iii) ultimately establish the neural network from that generated discrete vocabulary for that host endpoint agent 101A-B once that predetermined threshold is satisfied/exceeded. This initial building/training process then allows the host endpoint agent 101A-B to use the analyzer module 105 in conjunction with that trained neural network with its own discrete vocabulary to provide (i) any real-time assessment of how anomalous any new process chains are as well as (ii) any anomaly scores generated from those real-time assessments of those newly analyzed process chains.

As such, in several embodiments, the host endpoint agent 101A-B may use both network and collections modules to discretely monitor and collect pattern of life data on each of the process chains executed on the endpoint computing device. Meanwhile, the communications module may be used by the host endpoint agent 101A-B to communicate with the AI based cyber security appliance 120 and any other host endpoint agents over the network 110. For example, both the communications module and collections module may cooperate to periodically send the pattern of life data via the communications module to the AI based cyber security appliance 120. In some embodiments, the collections module may also be used to gather/collect any desired pattern of life data points observed from that particular endpoint computing device. These observed pattern of life data points may include, but are not limited to, metadata, triggered events, newly detected process chains, and/or predetermined alerts pertaining to, for example, users, users' activities, various software processes, relationships between such software processes, device operations, altered operating system configurations, etc., as well as any other type of observed pattern of life data point selected to be sent with the communications module to the AI based cyber security appliance 120.

In these embodiments, the cyber threat module may cooperate with one or more other modules of the host endpoint agent 101A-B to particularly detect one or more anomalous process chains from one or more events particularly observed on that particular endpoint computing device. For example, the cyber threat module may reference one or more AI/machine learning models discretely trained on potentially harmful cyber threats to analyze in real time any potentially harmful anomalous process chains detected on the endpoint computing device based on, at least, the collected pattern of life data that deviates from the normal pattern of life data observed for that endpoint device. When a maliciously harmful cyber threat is detected, then at least a notice is generated to a user of the endpoint computing device.

In several embodiments, the cyber threat module may be located entirely within the host endpoint agent 101A-B and/or entirely within both the host endpoint agent 101A-B and the AI based cyber security appliance 120. Whereas, in other embodiments, the cyber threat module may be configured with (i) one portion located within the host endpoint agent 101A-B having limited functionality to respond to a set of conditions, threats, and so on, and (ii) another portion located within the AI based cyber security appliance 120 having unlimited functionalities. For example, in those embodiments, the one portion of the cyber threat module located within the host endpoint agent 101A-B may be used to (i) identify certain predetermined conditions, events, processes, etc., and/or (ii) generate certain predetermined triggers, alerts, autonomous responses, etc., particularly when/if that endpoint device identifies certain harmful threats and/or is not connected to the network 110 being used by the other portion of the cyber threat module located within the AI cyber security appliance 120.

The communications module may be used to securely communicate with and transmit data between any of the host endpoint agents 101A-B, the AI based cyber security appliance 120, and/or the other endpoint computing devices. For example, as noted above, the communications module may be configured to communicate/transmit data over the network 110 via one or more APIs hosted by the host endpoint agents 101A-B and/or the AI based cyber security appliance 120. As such, the host endpoint agents 101A-B may use the communications module in conjunction with the collections module to transmit/receive any particular pattern of life data to/from the AI based cyber security appliance 120 via the network 110.

In some additional embodiments, the communications module may transmit the collected pattern of life data to the AI based cyber security appliance 120 in order to initially ascertain one or more particular specification/configuration details for that AI based cyber security appliance 120. For example, the AI based cyber security appliance 120 may initially use the transmitted pattern of life data to (i) match a corresponding type of computing device, operating system (OS), and so on, to that particular endpoint computing device; and (ii) then apply/route a corresponding set of one or more AI/machine learning models particularly trained on that matched type of computing device, OS, and so on, for that particular endpoint computing device. As such, in those embodiments, the AI based cyber security appliance 120 may be configured to apply, initially, a corresponding set of AI/machine learning models based on a category of one or more different types of computing devices and operating systems that may correspond (or match) to a particular endpoint computing device.

In most embodiments, as clearly shown in FIG. 1, the host endpoint agent 101A-B may implement the multi-stage anomaly detector 115 to reside entirely within the analyzer module 105. Whereas, in some embodiments, the host endpoint agent 101A-B may implement one or more stages of anomaly detectors (or at least one or more portions) of the multi-stage anomaly detector 115 to reside within the analyzer module 105, while the other stages of anomaly detectors (or at least one or more of the other remaining portions) of the multi-stage anomaly detector 115 may not reside within (or located external from) the analyzer module 105. The multi-stage anomaly detector 115 may be configured to cooperate with the collections module, the network module, the anomaly score module, and/or any other module to implement in real time a variety of computational processes having various computational factors, parameters, and so on (e.g., as described below in more detail in regard to the multi-stage anomaly detector 115 shown in FIG. 5). Accordingly, as noted above, these implementations provided by the multi-stage anomaly detector 115 of the analyzer module 105 in conjunction with the vocabulary generated from the discretely trained neural network enable that host endpoint agent 101A-B to instantaneously assess a detected anomalous process chain and generate an anomaly score for that process chain in real time to thereby protect that endpoint computing device from a potentially harmful threat.

Note that such detectors described herein, such as the multiple detectors of the multi-stage anomaly detector 114, may carry out analysis of a second order metrics (or the like). These detectors may be discrete mathematical models that implement a specific mathematical method against different sets of variables within that system, network, platform, device, etc. As described below, the detectors may be provided in a hierarchy that is a loosely arranged pyramid of models. Each detector may be used as a detector model that effectively acts as a filter and passes its output to another detector model higher up that pyramid. At the top of that pyramid is the Bayesian probabilistic that may be used as the ultimate threat decision making model. Additionally, lower order detectors may each monitor different global attributes and/or features of the underlying system, network, platform, device, etc. These attributes may consist of value over time for all internal computational features, such as packet velocity and morphology, endpoint file system values, TCP/IP protocol timing and events, and so on. Each detector may be specialized to record and make decisions on different environmental factors based on that detectors own internal mathematical model, as described below in further detail.

Continuing with FIG. 1, the multi-stage anomaly detector 115 may generate the final anomaly scores based on at least one or more combined anomaly scores generated by the different stages of anomaly detectors. For example, the multi-stage anomaly detector 115 may include a plurality of stages of anomaly detectors, where each stage of the anomaly detectors may generate its own anomaly score based on its own computational data analysis processes. In several embodiments, as shown below in FIG. 5, the multi-stage anomaly detector 115 may be configured with a first stage of the anomaly detectors, a second stage of the anomaly detectors, and a third stage of the anomaly detectors.

Furthermore, based on these embodiments, the multi-stage anomaly detector 115 may configure the first stage, second stage, and third stage of the anomaly detectors to generate its own anomaly score (e.g., a first anomaly score, a second anomaly score, and a third anomaly score) based on one or more computational factors/parameters different from any previous computed factors/parameters used by any of the previous stages of the anomaly detectors. For example, each of the first, second, and third stages of the anomaly detectors may generate the first, second, and third anomaly scores respectively to produce the finalized anomaly score from the combination of one or more rapidly implemented anomaly scores and one or more thoroughly implemented anomaly scores. Also, it should be noted that the multi-stage anomaly detector 115 of the analyzer module 105 may include any number of stages of anomaly detectors without having any limitations.

Thereafter, once the anomaly score is generated, the trigger module may be configured to initiate one or more preventive steps (or actions, responses, etc.) on that endpoint computing device when (or if) the generated anomaly score exceeds a predetermined threshold, which the host endpoint agent 101A-B uses as an indication that the detected process chain presents a high likelihood of a harmful cyber threat. For example, the predetermined threshold may be selected from a range of numerical values extending from 0.00 to 1.00, where a low-value anomaly score may not trigger any preventive steps/actions, and a higher-value anomaly score may trigger the one or more preventive steps/actions. In some embodiments, the host endpoint agent 101A-B may configure the trigger module—in conjunction with the autonomous response module—to cooperate with the communications module to send one or more event alerts to the AI based cyber security appliance 120 as well as any other predetermined host endpoint agents, endpoint computing devices, networks, etc., that need to be made aware of such triggered event alerts.

Meanwhile, in other embodiments, the trigger module may be substantially similar to the autonomous response module, such that the trigger module may be entirely or partly omitted from the host endpoint agents 101A-B, but may still remain entirely within the AI based cyber security appliance 120. Accordingly, in some embodiments, rather than a trigger module and/or a human user taking an action, the autonomous response module may be configured to cause one or more preventive steps/actions to be initiated to thereby contain a detected cyber threat, when/if a generated anomaly score is indicative of a likelihood of a cyber-threat that is equal to or above an actionable threshold.

The autonomous response module may be configured to also cooperate with at least one of the anomaly score module and the cyber threat module to implement one or more computational processes and algorithms that factor in confidence in correctly identifying the existence of the cyber threat as well as the severity of the cyber threat posed, including the type of cyber threat, the files/directories/areas of sensitivity potentially being compromised, and so on, in order to generate an overall/finalized anomaly score from the detected cyber threat. For example, a human user, via a programmable user interface, may preapprove one or more response actions to autonomously take in order to attempt to contain a malicious threat. The preapproved autonomous response actions may be set in the user interface based on both an identified cyber threat and a threat score. Different threat scores may have different preapproved autonomous actions. For example, the anomaly score may take into consideration one or more factors, such as factoring the analysis of the potential cyber threats on the endpoint computing devices in light of the collected pattern of life data that deviates (or varies) from the normal pattern of life data for those particular endpoint computing devices. Note that, in some embodiments, portions of the autonomous response module may be located either in the host endpoint agents 101A-B or in the AI based cyber security appliance 120.

Accordingly, the AI based cyber threat system 100 takes advantage of the cooperation between each of these modules in the host endpoint agents 101A-B in order to: (i) provide real-time assessments and rapid determinations to any parties within the multi-host infrastructure that may be potentially impacted by the detection of harmful cyber threats (e.g., such parties may involve any users, modules, agents, devices, appliances, networks, etc.); and (ii) autonomously trigger and initiate a set of predetermined response actions on any endpoint computing devices in light of the detected harmful cyber threats, thereby mitigating and protecting such endpoint devices and peer groups from present and future cyber-attacks at least in regards to such detected treats.

For example, some of these autonomous response actions may include: (i) slowing down most (if not all) network and/or data processes running on that endpoint device when the determination of that anomalous process chain is made; (2) cutting all communication channels from that device and entirely disconnecting that device from any previously used/active connections, including the network, any internal data locations, the Internet, and so on; and/or (iii) flagging and/or sending alerts to one or more predetermined users (e.g., IT admin, management, the user itself, and so on). However, it should be understood that, in some embodiments, one or more of these autonomous response actions may only be triggered when/if an anomaly score correlates with a highly unusual process chain in conjunction with a highly unusual traffic behavior pattern. For example, the predetermined response actions described above may be triggered and initiated in such scenarios in which the rapid determination of the detected process chain certainly involves: (1) a type of malicious harmful malware or the like, (2) a substantially high degree of novelty (i.e., a substantially low number of previously observed frequency of such detected process chain), and/or (3) a highly unusual traffic behavior pattern involving unusual devices being connected via highly unusual communication channels.

Note that, according to most embodiments, any instructions of any modules of the host endpoint agents 101A-B shown in FIG. 1 may be scripted to be stored in an executable format in one or more memories and implemented by one or more processors of the respective endpoint computing devices.

Figure 2:
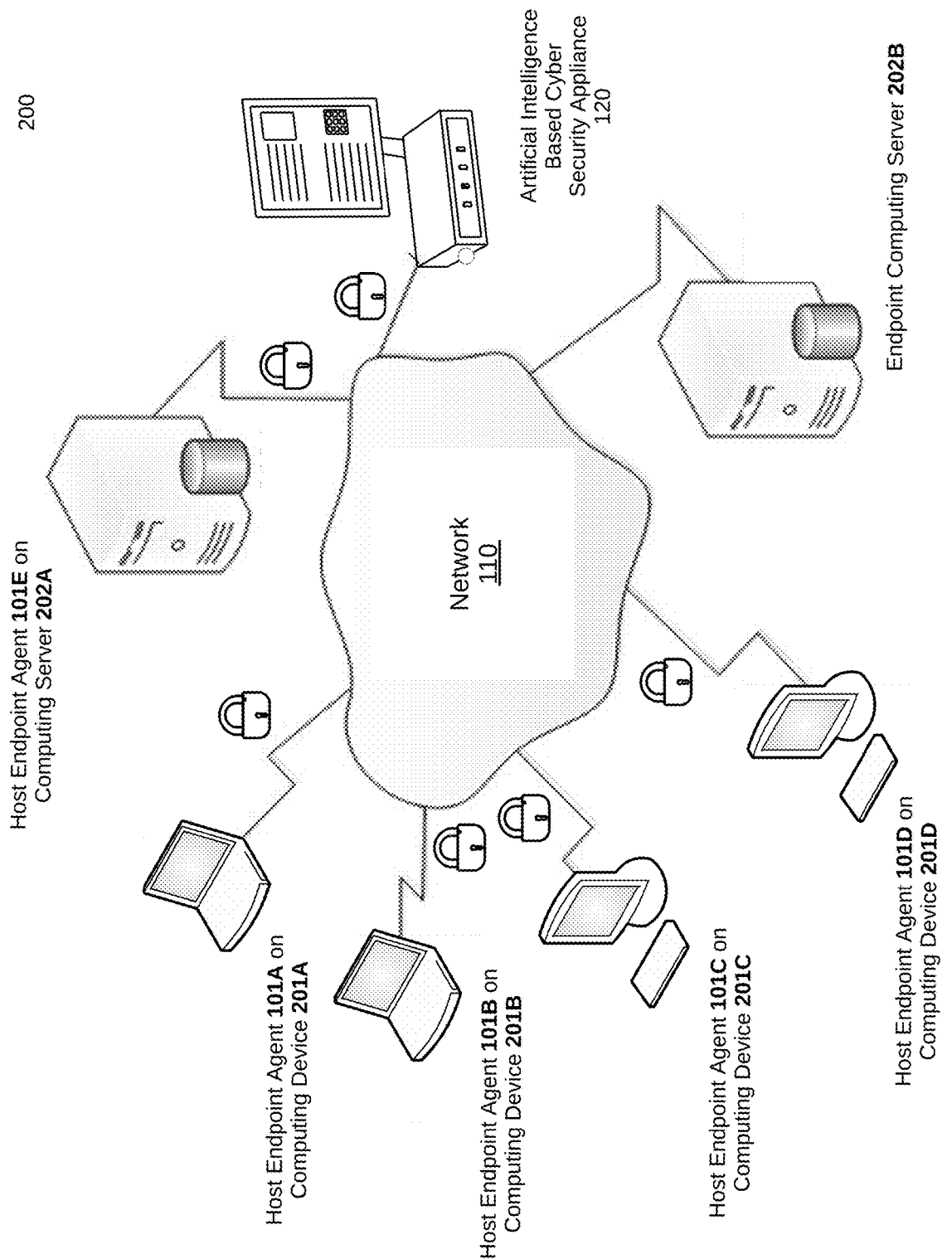
FIG. 2 illustrates a block diagram of an AI based cyber security system having an AI based cyber security appliance cooperating with a plurality of host endpoint agents on a plurality of endpoint computing devices communicatively coupled to a network, in accordance with an embodiment of the disclosure.

Referring now to FIG. 2, an AI based cyber threat security system 200 having an AI based cyber security appliance 120 communicatively coupled with host endpoint agents 101A-E, endpoint computing devices 201A-D, and endpoint computing servers 202A-B over a network 110 is shown, in accordance with an embodiment of the disclosure. The AI based cyber security system 200 may use the AI based cyber security appliance 120 depicted in FIG. 2 to cooperate with the host endpoint agents 101A-E on their respective endpoint computing devices 201A-D and server 202A via the secure communication channels established with the network 110. The AI based cyber threat security system 200 depicted in FIG. 2 may be substantially similar to the AI based cyber threat security system 100 depicted in FIG. 1. As such, in most embodiments, the host endpoint agents 101A-E, network 110, and AI based cyber security appliance 120 depicted in FIG. 2 may be substantially similar to the host endpoint agents 101A-B, network 110, and AI based cyber security appliance 120 depicted in FIG. 1.

In several embodiments, the AI based cyber threat security system 200 may use the AI based cyber security appliance 120 to cooperate with the various host endpoint agents 101A-E on the respective endpoint computing devices 201A-D and server 202A, which may be communicatively coupled to each other over the network 110. The AI based cyber security appliance 120 may be configured to receive any collected pattern of life data from any host endpoint agents 101A-101E. The host endpoint agents 101A-101E may be located and executed on the respective endpoint computing devices and server 201A-D and 202A.

In some embodiments, the network 110 may be: (i) an informational technology network, (ii) an operational technology network, (iii) a cloud infrastructure, (iv) a SaaS infrastructure, and/or (v) any combination thereof capable of being communicatively coupled to each of the respective endpoint computing devices and servers 201A-D and 202A-B. The network 110 may be used to communicatively couple the endpoint computing devices 201A-D to the endpoint computing servers 202A-B and the AI based cyber security appliance 120. Furthermore, as shown in FIG. 2, the endpoint computing server 202A may be communicatively coupled to the network 110 via a secure channel, whereas the endpoint computing server 202B may be communicatively coupled to the network 110 via an unsecure channel. In most embodiments, the endpoint computing servers 202A-B may include, but is not limited to, any type of server, database, data store, and/or cloud-based server, service, application, etc. The endpoint computing server 202A may be similar to the endpoint computing server 202B, with the exception that the endpoint computing server 202B is not hosted by a host endpoint agent, has limited functions and network capabilities, and is not capable of receiving secured data from any of the other endpoint computing devices 201A-D, server 202A, and/or AI based cyber security appliance 120. The endpoint computing devices 201A-D and server 202A may be any variety of computing devices capable of cooperating with the respective host endpoint agents 101A-E and AI based cyber security appliance 120 over the network 110.

In some embodiments, the host endpoint agents 101A-E may be configured—in conjunction their analyzer modules having their multi-stage anomaly detectors—to: (i) have a low system impact on the end-point computing-device and runs without degrading endpoint computing-device performance significantly; (ii) monitor the "pattern of life" of the end-point computing-device, its processes, such as Outlook, Word, etc., its users, events on that device, etc. This at least includes: (a) process behavior (use of network, filesystem, etc.), (b) relationships between processes (parent/child, shared files, IPC), and (c) user behavior (applications commonly used, IT habits); (iii) make reports on pattern of life metadata, events and alerts to an API whenever connected to the internet or LAN, and while offline, cache data to deliver when possible; (iv) assist in performing IT audits while also completing pattern of life data and events (e.g., the following list is illustrative and should not be considered exhaustive: (a) audit system details, for example installed operating systems, installed software, software versioning, security update status; (b) gather system usage activity such as shutdown periods, login failures, file modifications, network connections, etc.; and (c) record use of external devices or transfer protocols (e.g., USB usage, Bluetooth usage, email usage, etc.); and (v) autonomously react to anomalies in pattern of life: (a) cooperate with the appliance 120 with its significantly greater processing power, sets of models including, for example, pulling when available, any actions to be taken and/or be able to take a limited set of actions when a connection to the cyber defense appliance 200 is not available; (b) provide an operator with the ability to enable the end point agent to perform a select number of relatively simple actions when predefined conditions of suspicious behavior and/or anomaly level are met, independent of the cyber defense appliance; and (c) example actions may include, but are not limited to, prompt user, quarantine a suspicious process (from network access and process as well as internal computing device's process and filesystem), shutdown the offending processes, and others.

As described above, each host endpoint agent 101A-E may include an analyzer module configured to generate an anomaly score for each respective endpoint device/server 201A-D/202A. The analyzer module may further include a multi-stage anomaly detector having multiple stages of anomaly detectors (e.g., as shown with the multi-stage anomaly detector 115 in FIG. 1), where each stage may be configured to generate its own anomaly score using various computational processes and factors (or parameters) different from the computational processes and factors used by the other stages. For example, the computations processes and factors may include one or more different complexity levels of data analysis processes and algorithms, one or more various predetermined processing time periods, one or more different predetermined anomaly score thresholds, and so on. Accordingly, the multiple stages of the anomaly detectors may be arranged in a hierarchy configuration that combines different computational processes and factors to produce at least one or more rapidly generated anomaly scores as well as one or more thoroughly generated anomaly scores.

As described in greater detail below in FIG. 5, the generated anomaly scores may be based on one or more factors including at least: (i) how much a behavior under analysis (or a detected behavior pattern) varies from a normal behavior pattern of life of for an endpoint computing device (or the like) being protected by an AI based cyber threat security system (or platform), an AI cyber security appliance, and so on (i.e., also referred to as a level of interest factor); and (ii) an estimation on how severe of an impact the behavior under analysis could have on the system being protected by the cyber threat security platform (i.e., also referred to as an estimation of severeness factor).

The AI based cyber threat security system 200 may use the AI based cyber security appliance 120 in cooperation with the host endpoint agents 101A-E to implement a cyber threat detection platform configured to utilize multiple computational methods on different factors to rapidly generate (or determine) anomaly scores for various detected anomalous process chains. In host device environments, unique processes including applications execute and interact with each other in an extremely rapid fashion compare to, for example, an in transit network packet—and thus needs to be analyzed in a true real time basis. For example, a clock speed on host device may allow much faster interaction time (e.g., Gigahertz compared to a network transaction time).

The cyber threat detection platform may thus be used to offer a fast online anomaly detection process to augment, for example, a recurrent neural network and/or the like. For example, a recurrent neural network (RNN) is good at sequence prediction and consequently good at finding anomalies in sequences. However, in online learning scenarios, the RNN may fail when the input contains previously unobserved symbols; and in high throughput scenarios, where detection must be determined in real time, the prediction of the RNN may be too slow to keep up if sequences are long, if the RNN has many layers, and so on.

Thus, the AI based cyber threat security system 200 may be implemented to: (i) readily detect one or more unique (or anomalous) processes that have never or even only recently become resident on a host endpoint device; (ii) properly analyze in real time whether those new and/or unique detected processes are potentially malicious or not; and (iii) then generate one or more anomaly scores for those analyzed processes, where the generated anomaly scores correlate to whether those detected processes have a high or a low likelihood of being potentially malicious cyber threats on the host endpoint agent. This may be implemented by configuring the first couple of stages of anomaly detectors (i.e., the first and second stages of the anomaly detectors) within the analyzer module to both: (i) assist in presenting anomaly scores for common processes, while filtering out any number of processes that the slower, but more thorough, last stage(s) of anomaly detector(s) need to process (i.e., the third stage of the anomaly detectors which may be configured as a neural network anomaly detector); and (ii) provide the capability to analyze processes that have not been seen before and respectively generate scores that indicate their potential likelihood of being harmful threats. Accordingly, in several embodiments, the analyzer module may configure the first and second stages of the anomaly detectors in conjunction with the third stage of the anomaly detectors may be configured to cooperate with each other and individually be capable of providing anomaly detection in sequences (i.e., a sequential array of "detectors").

The analyzer module may thus be used for overseeing an array of detectors, where each detector may compute an anomaly score for an input sequence of a process or process chain. Namely, in most embodiments, the analyzer module may be configured for (i) preprocessing incoming events of process chains, (ii) choosing one or more detectors to query, and (iii) aggregating the outputs of queries to each detector. Some detectors may be unconditionally queried, while some detectors may be arranged in a hierarchy such as the sequential array of anomaly detectors. Each of these detectors may be used to model the probability of a series of paths in the process chain. Moving from left to right in the array of detectors, each subsequent detector may become more sophisticated, make fewer assumptions, and catch more subtle anomalies. Also moving from left to right, the timing factor for calling the query for that detector increases by orders of magnitude. For example, given that most events are uninteresting, the analyzer module may be hit with many queries per unit of time and struggling to keep up, as such it may be sensible to only spend time calling querying the detectors further to the right of the array occasionally, if the detectors further to the left of the array judge an event to be suitably suspicious. As such, in several embodiments, the leftmost detector may be queried first and every subsequent detector may only be queried if the strength from the previous detector is greater than an urgency threshold (or an urgency parameter).

On the other hand, where the endpoint computing device already possesses a third-party endpoint agent, the system 200 may use the appliance 120 to adapt the third-party endpoint to supply similar pattern of life data and take a limited range of actions. The appliance 200 may include a unifying endpoint detection and response process (EDR)/endpoint protection platform (EPP) translator configured to understand and be able to exchange communications with other endpoint security processes on the endpoint computing-device. The unifying EDR/EPP translator may have a set of connector Application Programming Interfaces (APIs) to map conveyed information from a plurality of different known endpoint security processes including one of more EDRs, EPPs, and any combination of both EDRs and EPPs (e.g., as shown below with the unifying multi-host translator module depicted in FIG. 4). An example set of connector APIs in the unifying EDR/EPP translator to communicate with other security processes may include, but are limited to, default operating system logging solutions such as Windows Event Forwarding, Sysmon, any popular EDRs or EPPs such as Antivirus/malware applications, etc.

Note, the EDR processes may be endpoint security tools that may both detect and respond to cyber exploits as well as provide a wealth of data including alerting, and forensic analysis. An EPP may be an integrated security solution designed to detect and block threats at device level. Typically this includes antivirus processes with known signature-based detection, anti-malware processes with known signature-based detection, data encryption processes, personal firewalls, intrusion prevention (IPS) processes and data loss prevention (DLP) processes. Note, the set of connector APIs for the unifying EDR translator may structurally reduce the number of APIs by mapping conveyed information from a plurality of different known EDRs & EPPs to a central tier of APIs, which further condenses the number of separate conversions to be able to take in EDR information as well as from popular EPPs.

Also, in some embodiments, the appliance 120 may employ existing security processes, EDRs and/or EPPs from other vendors running on the endpoint computing devices/server 201A-D/202A to function as versions of the host endpoint agents 101A-E. The appliance 120 may achieve interoperability with other security processes on any of the endpoint computing devices/server 201A-D/202A with the set of connector APIs to tap into the diverse capabilities of multiple EDRs and/or EPPs. The translator connector APIs request relevant details from the one or more existing third-party agents on the endpoint computing devices/server 201A-D/202A to feed back through the unifying translator and into the appliance 120 as pattern of life data. Note, although the appliance 120 may be able to utilize existing third party endpoint agents and logging solutions to gather end-computing device pattern of life data, this data may often be incomplete or requires interaction with multiple different agents as the third-party agents are merely utilized rather than designed for this purpose of collecting pattern of life data. As such, the unifying translator allows the appliance 120 to utilize third party agents when/if installing any of the respective host endpoint agents 101A-E is not feasible, but this may not be a preferable or as data-rich solution.

Furthermore, as described above, each of the host endpoint agents 101A-101D may also have their own collections module cooperating with two or more probes that include, but are not limited to, at least: (i) a first type of probes specifically configured to collect data from an operating system of its respective endpoint computing devices/server 201A-D/202A; (ii) a second type of probes specifically configured to collect data from each individual process executing on that endpoint computing devices/server 201A-D/202A; and (iii) a third type of probe configured to collect system event and logging data from that endpoint computing devices/server 201A-D/202A. The collections module may cooperate with one or more of the third type of probes to monitor and record events occurring on those endpoint computing devices/server 201A-D/202A. The collected data from the operating system and individual processes along with the recorded events may be sent in the collected pattern of life data by the collections modules to the appliance 120.

The collections module's framework runs probes in communication with the other various modules and data stores. The first type of probes may monitor the operating system to gather profiling pattern of life data about the system state. This information may include, for example, installed applications, software versions, operating system and pending security updates. Meanwhile, the second type of probes may monitor individual processes themselves to gather process pattern of life data such as, but not limited to, associations between parent and child processes, network connectivity and process interaction, file system interaction, etc. Lastly, the third type of probe may detect and record events and collaborate with default system event logging tools. This probe may gather events such as, for example, connections to new Wi-Fi or wired networks, interaction with peripheral devices (including, but not limited to, universal serial bus, visual displays, etc.) and system usage events such as power management, file modification, etc.

In these embodiments, the network module and the endpoint agent coordinator module of the appliance 120 may be used to analyze metrics from these entities (e.g., network entities including servers, networking gateways, routers, each endpoint agent connected to the network) using one or more models. The models may be a self-learning model trained on a normal behavior of each of these entities. The self-learning model of normal behavior is then continuously updated with actual behavior of that entity. The self-learning model of normal behavior is updated when new input data is received that is deemed within the limits of normal behavior. The modules may compare the analyzed metrics received from the probes and hooks to a moving benchmark of parameters that correspond to the normal pattern of life for the computing system used by the self-learning model. Accordingly, the cyber threat module may then determine, in accordance with the analyzed metrics and the moving benchmark used by the self-learning model of normal behavior of the entity, an anomaly score indicative of a likelihood of a harmful cyber threat and its severity.

Note, a normal behavior threshold may be used by the models as a moving benchmark of parameters that correspond to a normal pattern of life for the entities. The normal behavior threshold is varied according to the updated changes in the computer system allowing the model to spot behavior on the computing system that falls outside the parameters set by the moving benchmark.

Again, as described above, any of the host endpoint agents 101A-E may have an autonomous response module that causes one or more autonomous actions to be taken to contain the cyber threat when detected and when: (i) that endpoint agent is not connected to the network 110 where the appliance 120 is installed, (ii) the appliance 120 is unavailable to communicate with the endpoint agent, and/or (iii) any combination of (i) and/or (ii) occur. The autonomous response module located in the that endpoint agent may take one or more autonomous response actions preapproved by a human user when predefined conditions of suspicious behavior and/or anomaly level are met, independent of the appliance 120 to autonomously attempt to contain the potential cyber threat.

Again, the autonomous response module, rather than a human taking an action, may be configured to cause one or more autonomous actions to be taken to contain the cyber threat when a potential cyber threat is detected. It should be understood that, in some embodiments, the appliance 120 may have the autonomous response module, and/or one or more portions of the autonomous response module may exist on that host endpoint agent, while the majority portion may remain on the y appliance 120 due to greater processing power. A user programmable interface hosted on the appliance 120 having any of fields, menus, and icons may be configured to allow a user to preauthorize the autonomous response module to take actions to contain the cyber threat. The user programmable fields/menus/icons for allowing preauthorization may include, but are not limited to, killing individual processes, revoking specific privileges, preventing the download of specific files, allowing only processes observed in the pattern of life for peer devices to be active for a set period, and asking other EPPs to quarantine suspicious files, etc., while not disturbing operations of other processes going on inside that device.

The user programmable interface has the granularity in options available to the user to program the autonomous response module to take very specific actions such as killing individual processes, revoking specific privileges while still permitting other permissions for that user, getting live terminal access, preventing the download of specific files, allowing only processes observed in the pattern of life for peer devices to be active for a set period, asking other EPPs to quarantine suspicious files, etc. while not shutting down an entire device, or blocking all outside communications, or revoking one or more but not all of that user's privileges. Actions such as revoking only some user privileges or enforcing the peer pattern of life allow the user to continue working but just not perform certain connections or run certain processes, which most likely a malicious piece of software was initiating, such as accessing and downloading sensitive files while the user, completely unaware of the malicious software using their credentials, is doing a normal activity for that user such as typing out a document or entering data into a program.

Example autonomous actions available to be pre-approved by a human user for the autonomous response module may include a general prompt to the user on the display screen of the endpoint computing device along with the action of: (i) prevent or slow down activity related to the threat; (ii) quarantine or semi-quarantine people, processes, devices; and/or (iii) feed threat intelligence to EPP and EDR processes and devices to take third party or vendor specific actions such as quarantine or firewall blocks. Note that, in most embodiments, such actions may be triggered without disrupting the normal day to day activity of users or other processes on that endpoint computing device.

Again, the communications module may send collected pattern of life data to the appliance 120 at periodic intervals when connected to the network 110 where the cyber security appliance 120 is installed. The communications module may also send collected pattern of life data to one or more memories of that endpoint computing device (i) when not connected to the network 110, where the cyber security appliance 120 is installed as well as (ii) when the cyber security appliance 120 is unavailable; and (iii) then in either situation, delivers the collected pattern of life data when possible.

Figure 3:
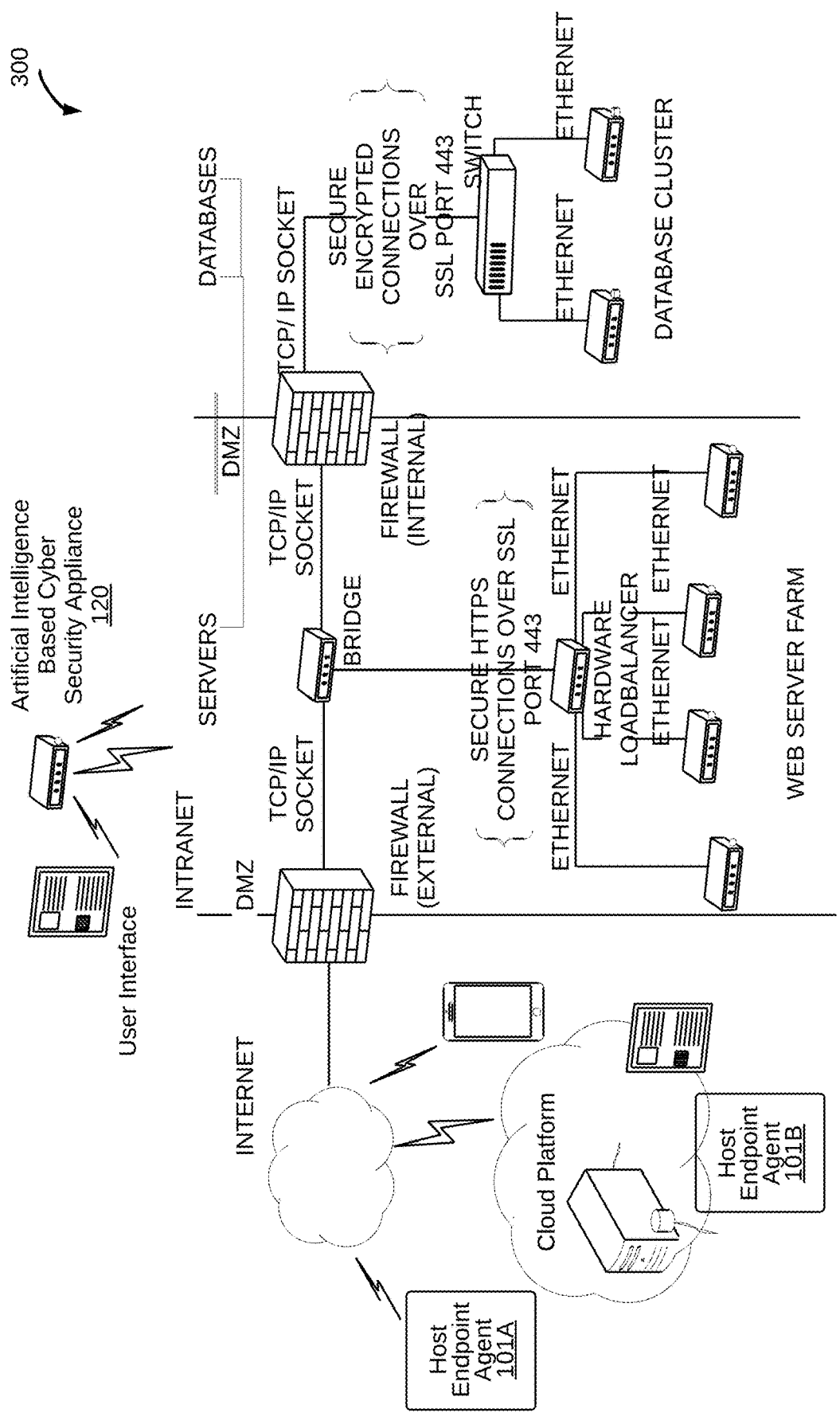
FIG. 3 illustrates a block diagram of an exemplary AI based cyber security platform having an AI based cyber security appliance configured to protect various network devices and host endpoint agents communicatively coupled over a network, in accordance with an embodiment of the disclosure.

Referring now to FIG. 3, an AI based cyber security network environment 300 having an AI based cyber security appliance 120 configured to protect host endpoint agents 101A-B and a variety of network devices is shown, in accordance with an embodiment of the disclosure. As shown in FIG. 3, the AI based cyber security network environment 300 may use the AI based cyber security appliance 120 to cooperate with the host endpoint agents 101A-B and the other network devices to communicate with each other in this network environment 300. The AI based cyber security network system 300 depicted in FIG. 3 may be configured similar to the AI based cyber threat security systems 100 and 200 depicted in FIGS. 1-2. As such, in most embodiments, the host endpoint agents 101A-B and AI based cyber security appliance 120 depicted in FIG. 3 may be substantially similar to the host endpoint agents 101A-B and AI based cyber security appliance 120 depicted in FIGS. 1-2.

The AI based cyber security network environment 300 may be configured as a communications network. The network may include one or more networks selected from, but not limited to, an optical network, a cellular network, the Internet, a LAN, a WAN, a satellite network, a $3^{rd}$ party "cloud" environment, a fiber network, a cable network, and/or any combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system) may communicate with the server(s). The client computing system may include, for example, the software application or the hardware-based system in which may be able exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud user's cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be coded to utilize a protocol, such as hypertext transfer protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access may be coded to engage in: the request and response cycle from all web browser based applications; the request and response cycle from a dedicated on-line server; the request and response cycle directly between a native application resident on a client device and the cloud-based remote access to another client computing system; and/or combinations thereof.

In an embodiment, the server computing system may include a server engine, a web page management component, a content management component, and a database management component. The server engine may perform basic processing and operating system level tasks. The web page management component may handle creation and display, or routing of web pages or screens associated with receiving and providing digital content and digital advertisements. Users (e.g., cloud users) may access one or more of the server computing systems by means of a uniform resource locator (URL) associated therewith. The content management component may handle most of the functions in the embodiments described herein. The database management component may include, but is not limited to, storage and retrieval tasks with respect to the database, queries to the database, storage of data, and so on.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any hypertext markup language (HTML), wireless access protocol (WAP) enabled client computing system (e.g., the client computing system), and/or any equivalent thereof.

The client computing system may host a browser and/or a specific application to interact with the server computing system. Each application has a code scripted to perform the functions that the software component is coded to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Figure 4:
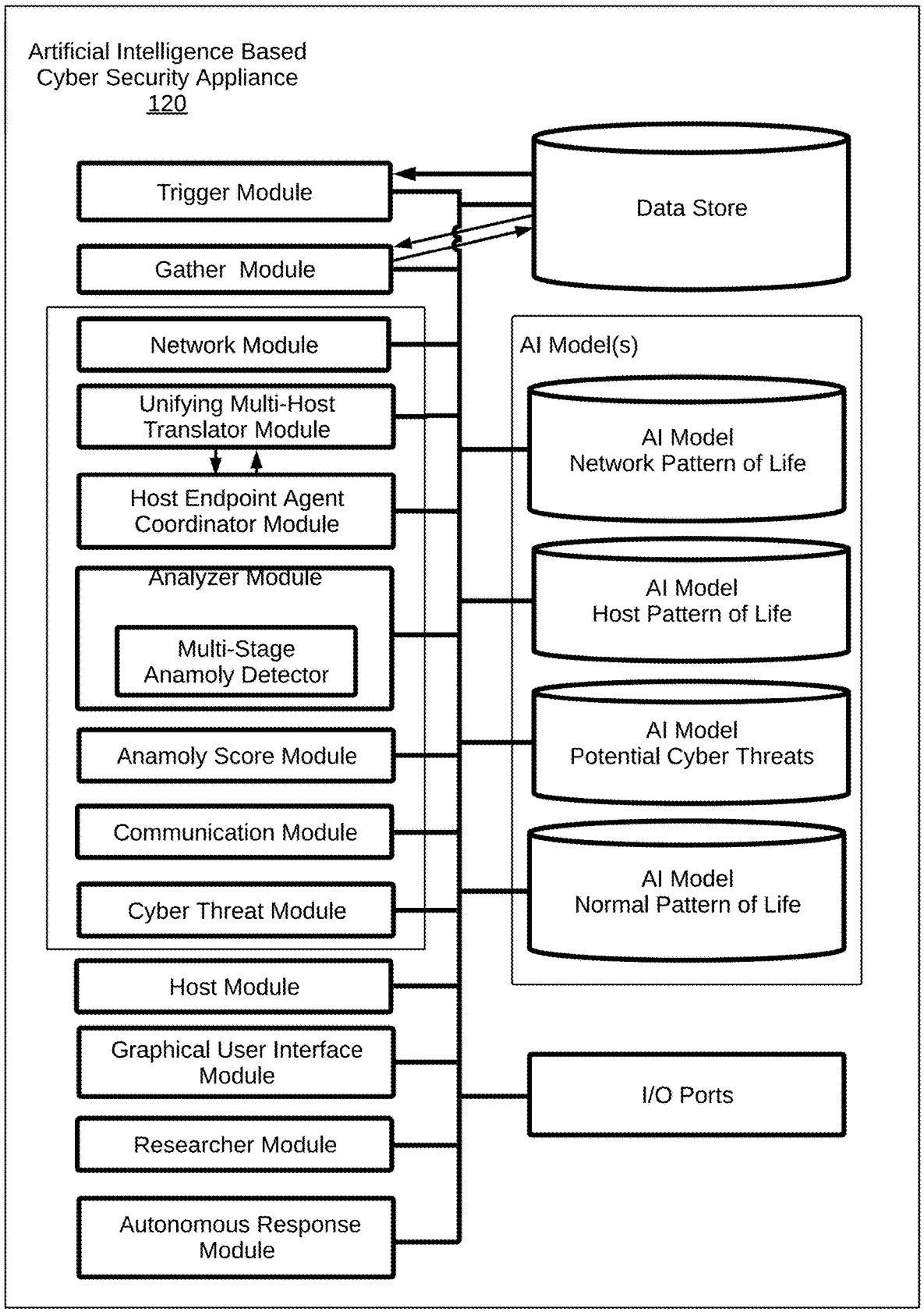
FIG. 4 illustrates a block diagram of an AI based cyber security appliance with various modules cooperating with various machine learning models trained on the discrete pattern of life of one or more host endpoint agents to detect anomalous process chains, in accordance with an embodiment of the disclosure.

Referring now to FIG. 4, an AI based cyber security appliance 120 with various modules cooperating with various AI/machine learning models trained on the discrete pattern of life of one or more host endpoint agents to detect anomalous process chains is shown, in accordance with an embodiment of the disclosure. The AI based cyber security appliance 120 cooperating with multiple instances of the host endpoint agent(s) 101A-B depicted in FIG. 1 may protect against cyber security threats from maliciously harming networks as well as from maliciously harming all of the end-point computing-devices connecting to that network where the AI based cyber security appliance 120 is installed. The AI based cyber security appliance 120 depicted in FIG. 4 may be substantially similar to the AI based cyber security appliance 120 depicted above in FIGS. 1-3. As such, in most embodiments, the host endpoint agents 101A-B referenced and discussed in FIG. 4—in reference to the AI based cyber security appliance 120 depicted in FIG. 4—may be substantially similar to the host endpoint agents 101A-B depicted in FIGS. 1-3.

The AI based cyber security appliance 120 may include components one or more modules, stores, and/or components, including, but not limited to, a trigger module, a gather module (or a collections module), a data store, a host module, a graphical user interface module, a researcher module, an autonomous response module, at least one input or output (I/O) port to securely connect to other network ports as required, and one or more portions and/or modules pertaining to the host endpoint agents 101A-B, such as, but not limited to, a network module, a unifying multi-host translator module, a host endpoint agent coordinator module, an analyzer module with a multi-stage anomaly detector, an anomaly score module, a communication module, and a cyber threat module.

The analyzer module with the multi-stage anomaly detector depicted in FIG. 4 may be substantially similar to the analyzer module 105 with the multi-stage anomaly detector 115 depicted in FIG. 1. For example, when an endpoint computing device is hosted by a third party host endpoint agent or the like, the AI based cyber security appliance 120 may use the analyzer module with the multi-stage anomaly detector depicted in FIG. 4 to (i) receive a signal of anomalous process on that endpoint device while still using their current neural network stored within the AI model(s), (ii) in real time analyze that received signal in light of their current neural network, and (iii) rapidly determine whether that received signal is indicative of a potential cyber threat based on a generated anomaly score using fast online anomaly detectors with augmented neural network processes, as described herein. Note that, in some embodiments, the cyber threat module may not be limited to only the host endpoint agents 101A-B, and may thus be configured to cooperate with other host endpoint agents, devices, and so on.

Furthermore, the AI based cyber security appliance 120 may include one or more AI and machine learning models such as, but not limited to, a first set of AI models (i.e., the AI model network pattern of life) trained different aspects of the network including users, devices, system activities and interactions between entities in the system, and other aspects of the system; a second set of AI models (i.e., the AI model host pattern of life) trained on pattern of life of host/endpoint computing devices hosting instances of the respective endpoint agents (e.g., trained on the pattern of life pertaining to the host endpoint agents 101A-B) including: the users, the multiple software processes, relationships between the software processes, device operation, operating system configuration changes, and other such aspects; a third set of AI models (i.e., the AI model potential cyber threats) trained on any variety of potential cyber threats; and one or more other types of AI models (i.e., the AI model normal pattern of life), each trained on different types of computing devices and operating systems for each type of particular computing device, and other aspects of the systems, as well as other similar components in the AI based cyber security appliance 120. The one or more modules utilize probes to interact with entities in the network (e.g., as described above with the probes depicted in FIG. 3). It should be noted that many of these modules shown in FIG. 4 are substantially similar to the respective modules used in the host endpoint agents 101A-B and/or the AI based cyber security appliance 120 described above in FIGS. 1-3, such that those respective modules may be referenced herein without any limitation.

The trigger module may detect time stamped data indicating one or more events and/or alerts from unusual and/or suspicious behavior/activity that are occurring and may then trigger that something unusual is happening. Accordingly, the gather module may be triggered by specific events and/or alerts of anomalies, such as an abnormal behavior, a suspicious activity, and/or any combination thereof. The inline data may be gathered on the deployment from a data store when the traffic is observed. The scope and wide variation of data available in the data store results in good quality data for analysis. The collected data may be passed to the various modules as well as to the data store.

The gather module (or the collections module) may comprise of multiple automatic data gatherers that each look at different aspects of the data depending on the particular hypothesis formed for the analyzed event and/or alert. The data relevant to each type of possible hypothesis will be automatically pulled from additional external and internal sources. Some data is pulled or retrieved by the gather module for each possible hypothesis from the data store. A feedback loop of cooperation may occur between the gather module and the various modules including, but not limited to, the network module, the host endpoint agent coordinator module, the communications module, the cyber threat module, and/or the researcher module.

In addition, the coordination occurs between the above modules and the one or more AI models trained on different aspects of this process. The cyber threat module may cooperate with the network module and the host endpoint agent coordinator module to identify cyber threats based on analysis and determinations by the analyzer module, the anomaly score module, and such. Each hypothesis of typical cyber threats may have various supporting points of data and other metrics associated with that possible threat, such as a human user insider attack, inappropriate network behavior, inappropriate behavior in a particular endpoint computing device, etc. The AI/machine-learning algorithm may look at the relevant points of data to support or refute that particular hypothesis of what the suspicious activity or abnormal behavior related for each hypothesis on what the suspicious activity or abnormal behavior relates to. Networks may have a wealth of data and metrics that may be collected. The gatherer modules may then filter or condense the mass of data down into the important or salient features of data. In an embodiment, the various modules may be combined or kept as separate modules.

The network module and/or the communications module may receive data on the network from the set of probes. For example, each host endpoint agent 101A-B may communicate and exchanges information with the AI based cyber security appliance 120. The network and/or communications modules may reference any of the various available AI machine learning models. The endpoint agent coordinator module may reference one or more of the AI models, using machine learning and Artificial Intelligence algorithms, that are trained on a normal pattern of life of that endpoint computing device with that host endpoint agent 101A-B. The network module may also reference one or more AI/machine learning models, using machine learning and AI algorithms, that are trained on a normal pattern of life of the network.

A researcher module (or a comparator module) may compare the received data on the network and/or the host endpoint agents 101A-B to the normal pattern of life for these individual entities and others in the wider network context in order to detect anomalies and any future potential cyber threats. Note that, once the normal pattern of life has been learned by the models, the network module, the endpoint agent coordinator module, and/or the researcher module may readily identify the anomalies in the normal pattern of life and thus any unusual behaviors from the devices, users, or other aspects of the network and its associated host/endpoint computing devices. Also note that, once the normal pattern of life has been learned by the models, any other modules may be configured to cooperate together to readily identify the anomalies in the normal pattern of life and thus any unusual behaviors from the devices, users, or processes of the network and so on.

The coordinator module may analyze and integrate both activities occurring in the network as well as activities occurring internally within each end-point computing-device at the same time when analyzing the detected anomalies in the normal pattern of life in order to detect the cyber threat. For example, each host endpoint agent may provide pattern of life data to the cyber defense appliance so it may derive pattern of life for each end-point computing-device.

The graphical user interface may display metrics, alerts, and events of both the network in light of activities occurring in endpoint computing device on a common display screen. The graphical user interface allows a viewer to visually contextualize the metrics, alerts, and/or events occurring in the network in light of the activities occurring in the end-point computing-devices on the common display screen. The graphical user interface also allows a viewer to then to confirm the detected cyber threat in view of what is happening in the network as well as in the endpoint computing devices.

The cyber threat module may compare a chain of one or more of the detected anomalies by referencing one or more machine learning models trained on, at least, the cyber threat. Multiple AI/machine learning models may be trained, each model trained on a category of cyber threats and its corresponding members or each model trained on its own specific cyber threat. The cyber threat module cooperates and communicates with the other modules.

The AI based cyber security appliance 120 may supplement the data provided to the users and cyber professionals using a researcher module. The researcher module may use one or more artificial intelligence algorithms to assess whether the anomalous activity has previously appeared in other published threat research or known lists of malicious files or Internet addresses. The researcher module may consult internal threat databases or external public sources of threat data. The researcher module may collect an outside data set describing at least one of an action or a state related to the cyber threat present outside of the network from at least one data source outside the network.

The AI based cyber security appliance 120 may then take actions in response to counter detected potential cyber threats. The autonomous response module, rather than a human taking an action, may be configured to cause one or more rapid autonomous actions in response to be taken to counter the cyber threat. In some embodiments, the user interface for the response module may program the autonomous response module (i) to merely make a suggested response to take to counter the cyber threat that will be presented a display screen and/or sent by a notice to an administrator for explicit authorization when the cyber threat is detected; and/or (ii) to autonomously take a response to counter the cyber threat without a need for a human to approve the response when the cyber threat is detected. The autonomous response module may then send a notice of the autonomous response as well as display the autonomous response taken on the display screen.

The cyber threat module may cooperate with the autonomous response module to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

It should be understood that the AI based cyber security appliance 120 may be hosted on any type and number of computing devices, servers, etc., and/or may be configured as its own cyber threat appliance platform, without limitations.

Figure 5:
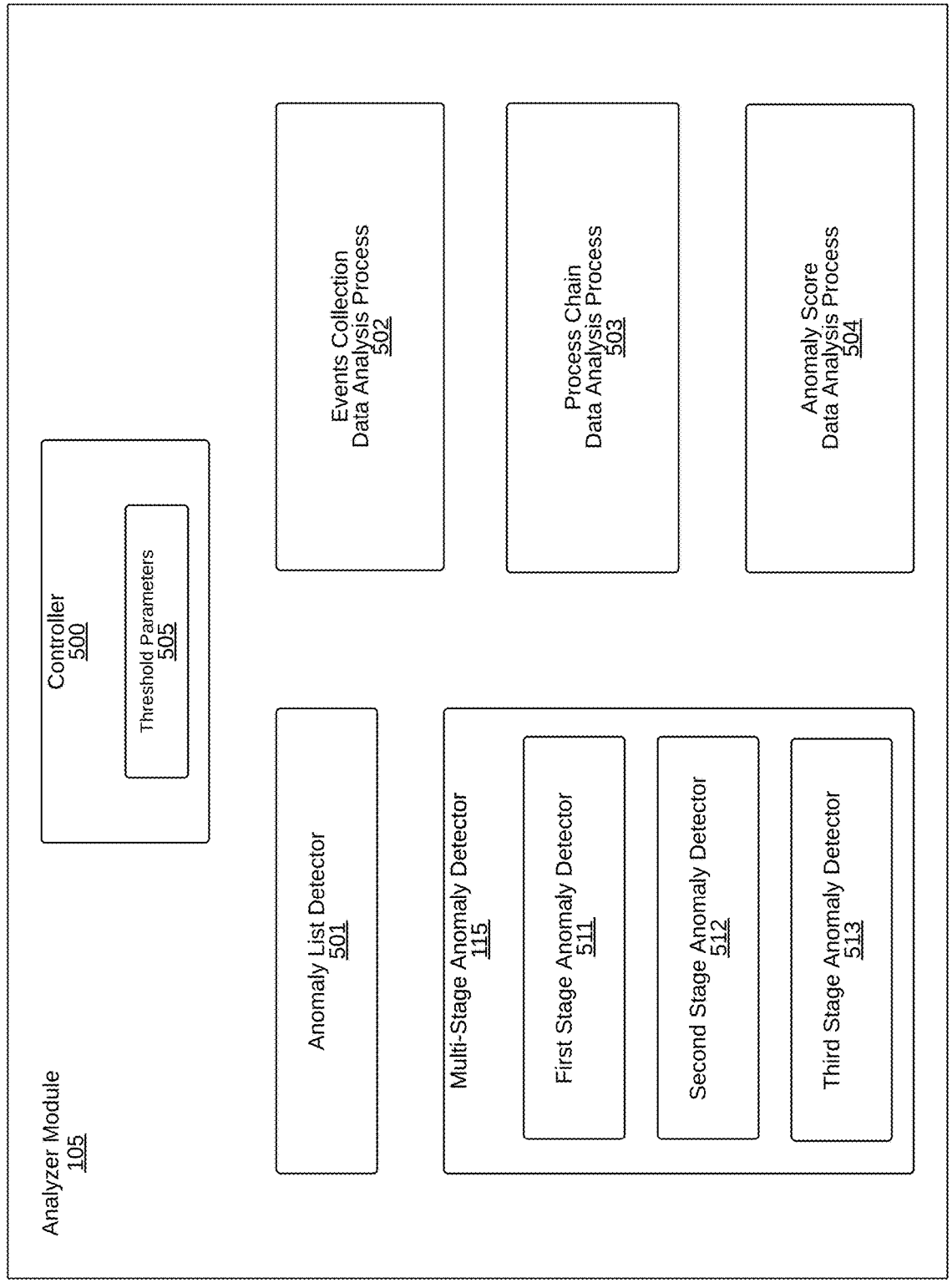
FIG. 5 illustrates a block diagram of an analyzer module having a controller, a multi-stage anomaly detector, and various data analysis processes trained to detect an anomalous process chain on the discrete pattern of life of a host endpoint agent on an endpoint computing device, in accordance with an embodiment of the disclosure.

Referring now to FIG. 5, an analyzer module 105 having a multi-stage anomaly detector 115, a controller 500, an anomaly list detector 501, and various other data analysis processes 502-504 trained to detect anomalous process chains is shown, in accordance with an embodiment of the disclosure. The analyzer module 105 with the multi-stage anomaly detector 115 depicted in FIG. 5 may be substantially similar to the analyzer module 105 with the multi-stage anomaly detector 115 depicted in FIG. 1. For example, the analyzer module 105 with the multi-stage anomaly detector 115 may be used in one or more of the host endpoint agents 101A-B depicted in FIGS. 1-3. Similarly, in this example, the analyzer module 105 with the multi-stage anomaly detector 115 depicted in FIG. 5 may be used in cooperation with those host endpoint agents 101A-B to reside on their respective endpoint computing devices, which may be similar to the endpoint computing devices 201A-B depicted in FIG. 2.

The analyzer module 105 may use the controller 500 to cooperate with the anomaly list detector 501 and/or the multi-stage anomaly detector 115 to generate an anomaly score using various computational processes, factors, parameters, etc., in conjunction with at least one or more of an events collection data analysis process 502, a process chain data analysis process 503, and an anomaly score data analysis process 504. The controller 500 may include one or more threshold parameters 505. The threshold parameters 505 may comprise one or more urgency parameters used to establish one or more static and/or to dynamic thresholds for passing an event from one detector to the next detector. As such, the controller 500 may be used to govern how fast and sloppy any execution of detectors takes and whether the strengthens of those detector exceed their respective thresholds in order to move from one detector to another detector in a hierarchy configuration.

For example, the controller 500 may be configured to measure a delay between a first timestamp for a query being received and a second timestamp for the result being returned. To avoid long delays, the controller 500 may be configured to dynamically adjust an urgency parameter (u) between zero and one (i.e., 0<u<1) using an additive increase multiplicative decrease rule and/or the like. In addition, the threshold parameters 505 may also include one or more timing parameters (or factors) such as delay time parameters, permissible delay parameters, and/or one or more step functions. The real-time input signal may have a timestamp that is substantially equal to a timestamp of the real-time output signal.

As described above, the analyzer module 105 may have multiple stages of anomaly detectors. In several embodiments, these multiple stages of anomaly detectors may include the anomaly list detector 501 cooperating with the multi-stage anomaly detector 115, where the multi-stage anomaly detector 115 may further include a first stage anomaly detector 511, a first stage anomaly detector 512, and a third stage anomaly detector 513. However, in other embodiments, the multiple stages of anomaly detectors used by the analyzer module 105 may include less stages of anomaly detectors and/or more stages of anomaly detectors based on various desired computational data analysis processes, AI models, threshold and timing parameters, and so on.

Accordingly, the multi-stage anomaly detector 115 may have the first, second, and third stages of anomaly detectors 511-513 arranged in a hierarchy configuration to combine different computational processes and factors, and to thereby produce at least one or more rapidly generated anomaly scores as well as one or more thoroughly generated anomaly scores. The first, second, and third stages of anomaly detectors 511-513 may each generate its own anomaly score, where such generated anomaly scores may be combined into an overall anomaly score for the multi-stage anomaly detector 115. As described above, the anomaly scores may be based on one or more factors including at least: (i) how much a behavior under analysis (or a detected behavior pattern) varies from a normal behavior pattern of life of for an endpoint computing device (or the like) being protected by an AI based cyber threat security system (or platform), an AI cyber security appliance, and so on (i.e., also referred to as a level of interest factor); and (ii) an estimation level of severeness factor of an impact of the potential cyber threat could have on the endpoint computing device. The estimation level of severeness factor can be used to determine an estimation on the severeness of a potential threat impact on the endpoint computing device and one or more peer group computing devices based on the determined behavior pattern for the detected cyber threat.

The multi-stage anomaly detector 115 may be configured to oversee an array of detectors such as the first, second, and third anomaly detectors 511-513. For example, the multi-stage anomaly detector 115 may be configured to preprocess incoming events, choose which detectors to query, and aggregate the outputs of queries to each detector. When the multi-stage anomaly detector 115 is called with an incoming event, the multi-stage anomaly detector 115 may implement that (i) one or more subset(s) of the detectors are queried with that event using its own query function, (ii) one or more responses from each queried detector(s) are recorded, and (iii) one or more of anomaly scores are combined into a list of strengths for those detectors.

Moving from left to right (or in sequence), the first, second, and third anomaly detectors 511-513 may become more sophisticated, make fewer assumptions, and catch more subtle anomalies. Also moving from left to right, the time for calling a query from the first, second, and third anomaly detectors 511-513 increases by orders of magnitude. Given that most events are uninteresting, the first, second, and third anomaly detectors 511-513 may be used based on their hierarchy configuration, such that time is only spent querying such detectors further to the right occasionally (e.g., the third stage anomaly detector 513 may be the detector furthest to the right), when/if such detectors further to the left judge that event to be suitably suspicious (e.g., the first stage anomaly detector 511 may be the detector furthest to the left). Thus, a downstream stage of the multi-stage anomaly detector is merely queried to generate its anomaly score when an anomaly score from an upstream stage of the multi-stage anomaly detector is greater than a threshold amount (e.g. a higher urgency parameter). The stages of the multi-stage anomaly detector can cooperate so that each of their anomaly scores are generated for one or more rapidly determined processes that filter out one or more thoroughly determined processes. The last stage of anomaly detectors (e.g. a neural network which is more complex than the upstream detectors) generates its anomaly score for its thoroughly determined processes, which can be filtered out by the earlier stages of the anomaly detectors based on their scores. When these not very abnormal processes are filtered out, then the last stage of anomaly detectors has more time to more thoroughly processes the remaining chains of parameters. Also, each anomaly score, from each stage (e.g., a first, a second, and a third anomaly scores) can be combined to thereby generate a combined anomaly score.

As such, in one example, the first stage anomaly detector 511 may be initially queried as the first and leftmost detector, where any subsequent detector such as the second stage anomaly detector 512 (and then the third stage anomaly detector 513) may only be queried if the strength of the anomaly score from the previous detector, such as the first stage anomaly detector 511, is greater than the respective urgency parameter from the threshold parameters 505 managed by the controller 500. Note that, when/if a detector is not queried, such detector may still need to be trained on the data from that event, such that the data from those unqueried detector(s) may be submitted for training and such to at least one or more of the events collection data analysis process 502, the process chain data analysis process 503, and the anomaly score data analysis process 504. Also note that different detectors may be configured to inspect different fields in events (i.e., assuming all the other fields do not affect the probability).

For example, the anomaly list detector 501 may be configured to simply focus on one field of a detected event, which provides a simple determination of whether a specific process and/or process chain has ever been observed on a specific endpoint computing device. Whereas, in another example, the first, second, third anomaly detectors 511-513 may be configured to focus on another field of that detected event, which provides varying complexity levels of analysis and determinations for a specific path for each process in that process chain on that device. Meanwhile, in other examples, one or more additional detectors may be configured to focus on one or more additional fields of that detected event, which provide one or more additional determinations such as, but not limited to, the start time for each process in that process chain, the query or start time for that connection for each process in that process chain, and so on.

In some embodiments, the anomaly list detector 501 may be a general detector configured to simply determine whether a detected anomaly process chain has ever been seen and executed on that particular device based on all trained data from that device. For example, the anomaly list detector 501 may be configured to provide a basic result such as yes and/or no. Note, the storage mechanisms for the list of processes seen/detected, frequency of appearance, and other data utilized may be stored in a database and/or in a more memory compressed format such as in a bloom filter structure. Note that, in other embodiments, the anomaly list detector 501 may be omitted and/or may not be a separate detector, where such determination from the anomaly list detector 501 may be alternatively determined by the multi-stage anomaly detector 115 and/or the like.

The first stage anomaly detector 511 may be configured to compute and generate an anomaly score for a process chain (or a sequence of symbols, tokens, processes, etc.), such as an executable path for the process, a file path for the process, and/or any other similar mechanisms to uniquely identify a process executing on that device. The first stage anomaly detector 511 may be used to determine how often that process chain has been executed, i.e., the first stage anomaly detector 511 counts the number of times the individual processes (or symbols) have been executed previously. As such, the generated anomaly score may correlate to how unusual the process chain is based on a total number frequencies that those individual processes have been previously executed (or estimating its distribution over possible chains), such as 70 times, 20 time, and so on. That is, the first stage anomaly detector 511 may generate a first anomaly score that correlates the more interesting and higher generated first anomaly score to the more rare and/or less frequent a uniquely identified process has executed on that device (and vice-versa).

The first stage anomaly detector 511 may be configured as a symbol frequency detector or the like. Such symbol frequency detector may be used to provide very fast analysis and determinations but may only detect general (or simple) anomalies. Furthermore, the first stage anomaly detector 511 may be configured to use hashes or the like and also use very simplistic math to determine a probability or other numeric amount correlatable to how often that process has been executed on this particular device. For example, such symbol frequency detector may build a distribution over a number of possible chains ("c") by assuming each element of the chain is uncorrelated and may thereby keep a list of each path previously observed, a number of times it has been observed, and a sum of lengths of all chains previously observed, where each of these factors are thus computed to generate a first strength and chain strength. Note that, in some embodiments, a downward bias factor may be implemented to strengths for non-anomalous chains that may cause the distribution of strengths to be weighted towards zero, which may be compensated for with a strength filter if needed. Also note that, in other embodiments, to avoid arbitrarily large memory use, the symbol frequency detector may submit a forget function to a queue when/if the length of that list goes above a predetermined threshold limit, where such limit may be managed by the threshold parameters 505 in the controller 500. The forget function may thereby increment random counters downwards to remove elements that reach or are substantially close to reaching zero until that list is below that limit.

The second stage anomaly detector 512 may be configured to compute and generate an anomaly score for a sequence of a specific process launch followed by another specific process based on the previously observed frequency of each "jump" in the sequence (e.g., symbol A followed by symbol B). The generated anomaly score may correlate to how unusual the process chain is based on a single previous frequencies that that process has been observed. That is, the second stage anomaly detector 512 may generate a second anomaly score that correlates the more interesting and higher generated second anomaly score to the more rare and/or less frequent this pair and/or set of uniquely identified processes have launched and/or interacted with each other on that device (and vice-versa).

The second stage anomaly detector 512 may be configured as a jump process pair interaction frequency detector or the like. Such jump process frequency detector may be used to provide moderately fast analysis and determinations but may also detect more subtle anomalies. Furthermore, the second stage anomaly detector 512 may be configured to use very simplistic mathematical operations to determine a probability or other numeric amount correlatable to how often a pair or set of processes launch and/or interact with each other. For example, such jump process frequency detector may build a distribution over possible chains by assuming each element of the chain to depend only on its immediate parent. As such, this computational process may follow on from the computational process established by the sequency frequency detector.

The jump process frequency detector may keep a record of how many times each call has been made. In other words, this detector may maintain a directed graph consisting of nodes representing paths, with edges between nodes representing calls, in which the sum is over all nodes that it has previously called. Note that the computational logic of this process may be similar to the computational logic of the symbol frequency detector, where the content of this logic may approach the p-value in such anomaly limit, and thereby the strength filter may compensate for the bias introduced by such approximation. Also note that in cases, where an element(s) of that chain has not before been observed, there is no way to properly compute some factors. As such, when/if this is the case for the minority of the elements in that chain, these factors may be simply left out of the final computation and compensated for automatically with the strength filter (or the like). However, when/if this is the case for the majority of the elements in that chain, the jump process frequency detector may instead need to generate a null response, which is one of the reasons the symbol frequency detector may be needed. Furthermore, to avoid arbitrarily large memory use similarly to the symbol frequency detector, the jump frequency detector may also submit a forget function to that queue when/if the size of that directed graph goes above a predetermined threshold limit, where such limit may be managed by the threshold parameters 505 in the controller 500. This forget function may thereby increment random counters downwards to remove edges reaching or substantially close to reaching zero as well as removing nodes with no edges, until that size of that graph is below that limit.

The third stage anomaly detector 513 may be configured to compute and generate an anomaly score for that process chain based on well-trained neural networks and/or the like. The generated anomaly score may correlate to how unusual the process chain is based on all previous frequencies that that process has been observed. The third stage anomaly detector 513 may be configured as a RNN detector or the like. Such RNN detector may be used to provide moderately slower analysis and determinations but may also detect very subtle anomalies. The RNN detector does not make any assumptions about correlation between elements in that process chain. However, in most embodiments, the RNN detector may make an assumption that the true distribution over chains is smooth enough to be approximated by an RNN with a finite number of recurrent units. The RNN detector may implement a bidirectional long short-term memory LSTM) recurrent neural network or the like, where such detector may accept an input of a parent chain and may output a vector of approximation of that chain for each possible chain that has been previously observed.

Moreover, the RNN detector may be trained based on a batch configuration that sends its own build train function to that queue and is fed in all the data of the multi-stage anomaly detector 115. The RNN detector may also be trained in a supervised fashion by moving through each chain and then feeding in each chain and pushing the output towards zero. This may be done by a gradient descent and a cross-entropy loss function. The strengths of the RNN detector may then follow substantially similar (or the same) computational logic as at least one or more of the symbol frequency detector and the jump frequency detector. However, note that in cases, where any part of the parent chain has not been observed by the RNN detector in training, one or more factors may not be properly computed. In this case, the RNN detector may need to generate a null response, which may be encountered during an initial building and training period of the RNN detector and is one of the reasons the symbol and jump frequency detectors may be needed. However, in other cases, the RNN detector may generate a null response during (or at) any time (or time period) when/if a path that is not in the RNN's vocabulary has not been observed and comes along. Moreover, to avoid arbitrarily large memory use similarly to the symbol and jump frequency detectors, the RNN detector may establish a predetermined memory requirement threshold to keep such memory from becoming arbitrarily large, where such threshold may be controlled with the threshold parameters 505 in the controller 500 and used to impose a maximum word count for the RNN detector.

Accordingly, such RNN detector may be used to provide relatively slow analysis and determinations but may detect very subtle anomalies that may analyze more details of how each process of that process chain is interacting with other processes and/or resources on that device. It should be understood that the third stage anomaly detector 513 may use one or more neural network processes/algorithms, including, but not limited to, deep learning neural network algorithms, feed forward neural networks, convolutional neural network (CNN), RNNs, perceptron algorithm, multilayer perceptrons (MLP) algorithms, back-propagation algorithms, stochastic gradient descent algorithms, Hopfield network algorithms, radial basis function network (RBFN) algorithms, LSTMs networks, stacked auto-encoders, deep Boltzmann machine (DBM), deep belief networks (DBN), as well as multiple type of transformer algorithms, and any other similar processes.

Note that each of the first, second, and third detectors 511-513 may (i) implement its own query function for that detected event, (ii) respectively return its own query response function for that detected event with one or more factors, such as a strength (or anomaly score), a chain strength, an anomaly message, and/or a strength breakdown, and (iii) lastly its own query determination function for that detected event with the determined strength as well as its determined anomaly message, which may subsequently trained on each of those detectors 511-513 based on data for that detected event on that device. Once those detectors have been queried and made their determinations, the number of strengths from their anomaly scores may be combined into an overall anomaly score for that process chain for that device. The combined anomaly score may be generated based on a weighted mean of those scores. The strengths of those scores from those detectors may then result in a single strength (or single anomaly score) for those scores as a single group of detectors.

In other words, this single group of detectors may establish an input sequence based on a query sequence configuration in which: (i) the first detector is only queried, (ii) the second detector is thereby only queried if the first anomaly score from that first detector is above the threshold parameter, and (iii) the third detector is last queried when/if the second anomaly score from that second detector is also above that threshold parameter. In some embodiments, the threshold parameter may be dynamically adjusted based on demand according to one or more computational rules (e.g., an additive increase multiplicative decrease rule), such that the threshold parameter may always dynamically adjust in order to keep up with larger throughputs of input sequences.

After the input sequence has been established, the set of first, second, and/or third generated anomaly scores are combined by a weighted average to produce that single anomaly score for that input sequence. Note that, when/if the second and/or third detectors may not be capable of generating anomaly scores (e.g., if a new process/symbol/token means the RNN fails), a mean calculation may be used to generate that single anomaly score by using the generated anomaly scores from the other remaining detectors. This allows for an overall anomaly score to always be generated even for any new and unobserved processes and so on.

In an embodiment, the weighted mean may be based on a Bayesian model that may calculate and average those scores in light of the detected event, the frequency of that event (i.e., the set of previously observed events), the default value for the weights, and so on. For example, the default values for the weights in the weighted mean may come from some empirical studies attempting to provide estimates for each detector. Furthermore, the strengths of the score(s) may not be approximations of probabilities, but rather p-values that may consist of linear combinations of probabilities or the like. Similarly, the strength may be intended to be an approximation of the p-values under a null hypothesis constructed from previous events, where, for example, a detector may be a type of model that approximates a probability distribution over all possible events. That is, in most embodiments, as strengths are approximations of the p-values, the strengths are ultimately approximate to: (1−p-values). As such, in most embodiments, the distribution of strengths coming out of a detector after suitable training should be approximately uniform over the domain [0; 1].

Furthermore, the analyzer module 105 may use the one or more data analysis processes such as, but not limited to, the events collection data analysis process 502, the process chain data analysis process 503, and the anomaly score data analysis process 504, which may thus be used to obtain any of the anomalous processes (or process chain), abnormal behaviors, and suspicious activities to start the investigation on the possible set of cyber threats hypotheses, as well as, to obtain the collection of system data points to either support or refute the possible cyber threat hypotheses. As such, the analyzer module 105 may be configured to use at least one or more of these analysis processes, including: (i) the events collection data analysis process 502 trained to detect the cyber threat based on any previously collected and trained events on that device; (ii) the process chain data analysis process 503 trained to assess any cyber threat based on any previously collected and trained processes, process chains, particular paths to particular processes for particular chains, etc.; and (iii) the anomaly score data analysis process 504 trained to identify and correlate any generated anomaly scores for any previously detected cyber threats for any previously trained events. Although only three data analysis processes 502-504 are shown in FIG. 5, it should be understood that the analyzer module 105 may use any number and any types of data analysis processes, without limitations.

Additionally, it should be understood that the output of multiple stages of anomaly detectors may be configured to cooperate with other factors such as: (i) an AI classifier trained to look at timing of launch such as what time and day of the week as well as the duration of that launch, for executables; and (ii) an AI classifier trained to look at a name of each process under analysis and look for human readable/understandableness of the name of that process, etc. For example, a launch process may look for and detect unique processes (including applications) resident on that device to create an initial vocabulary of processes present on that device. As such, the AI classifier trained on neural network generation may utilize a collection of resident processes to construct the neural network anomaly detector specific for that device. Similarly, the AI classifier trained on neural network generation may be programmed on how to perform the initial training of that created neural network anomaly detector specific for that device. Note that, in some embodiments, the pattern of life of what processes are resident on that device and how they interact may be tracked and modeled, such that new and unusual processes and their interactions may be determined while that device operates throughout its life.

Figure 6:
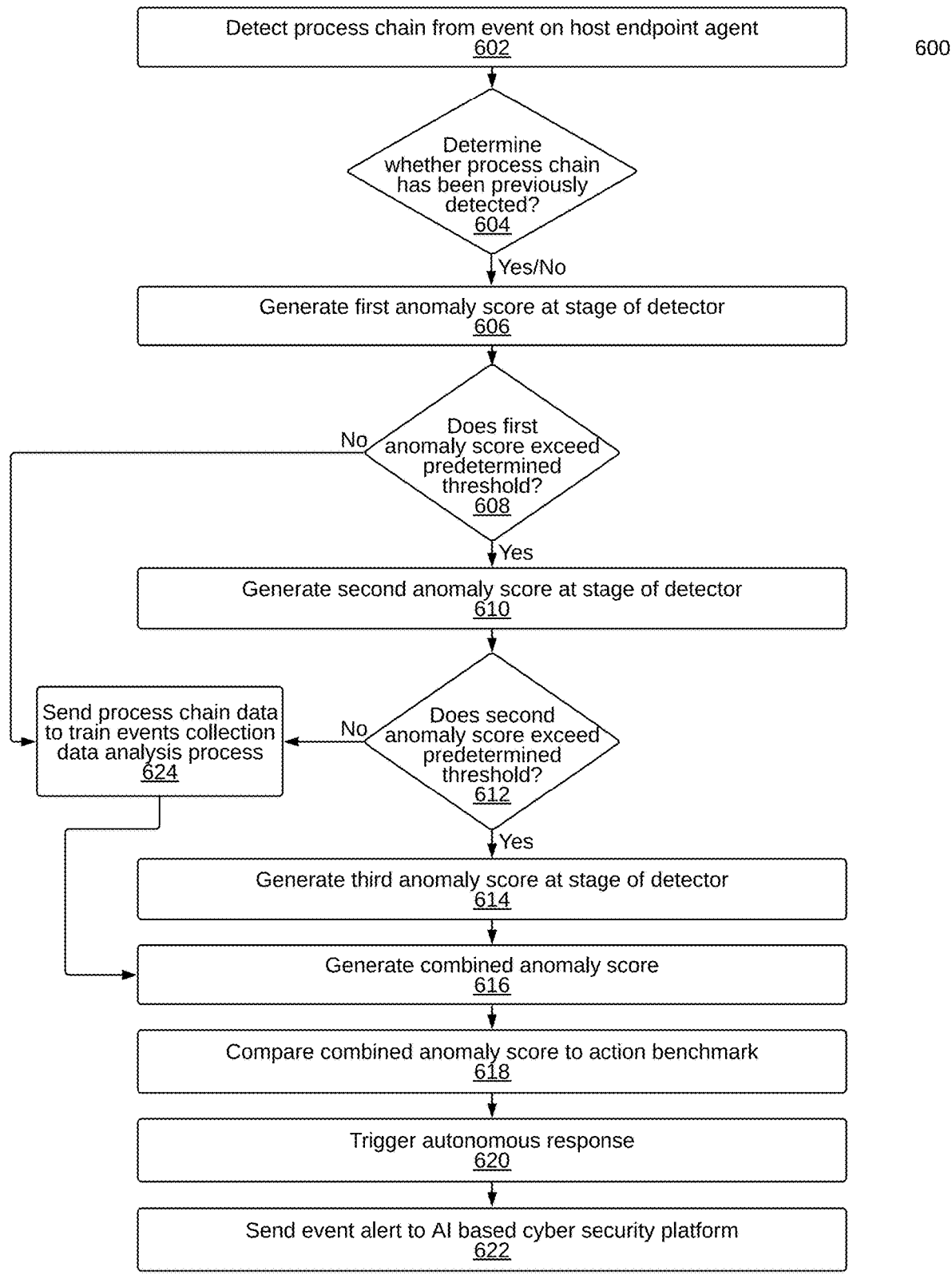
FIG. 6 illustrates a block diagram of a flowchart of a process for generating a combined anomaly score of an anomalous process chain detected in a host endpoint agent in an AI based cyber security platform, in accordance with an embodiment of the disclosure.

Referring now to FIG. 6, an exemplary process 600 for generating a combined anomaly score of an anomalous process chain in a host endpoint agent is shown, in accordance with an embodiment of the disclosure. For example, the process 600 may be depicted as a flowchart configured to detect various anomalous process chains in real-time in an AI based cyber threat security platform using an analyzer module of the host point agent. In an embodiment, the process 600 may be implemented with the analyzer module 105 of the host endpoint agent 101A in the AI based cyber threat security system 100 depicted in FIG. 1.

Furthermore, the AI based cyber threat detection platform may be configured to use multiple computational methods on different factors to rapidly determine an overall anomaly score based on one or more combined anomaly scores generated by a multi-stage anomaly detector of the analyzer module. As described above, the multi-stage anomaly detector may include multiple stages of anomaly detectors, where each stage of the anomaly detector may generate its own anomaly score and may utilize its own different data analysis computational process in order to produce its anomaly score, while factoring one or more different factors from any of the previous stages of anomaly detectors.

At block 602, the process 600 may detect a process chain from an event on a host endpoint agent. At block 604, the process 600 may determine whether the process chain has been previously detected in the host endpoint agent. At block 606, the process 600 may generate a first anomaly score at first stage of AD. At block 608, the process 600 may determine whether the first anomaly score exceeds a predetermined threshold. In response to determining that the first anomaly score does exceed the predetermined threshold, the process 600 may proceed to block 610. Whereas, in response to determining that the first anomaly score does not exceed the predetermined threshold, the process 600 may proceed to block 624.

At block 610, the process 600 may generate a second anomaly score at a second stage of AD. At block 612, the process 600 may determine whether the second anomaly score exceeds the predetermined threshold. In response to determining that the second anomaly score does exceed the predetermined threshold, the process 600 may proceed to block 614. Whereas, in response to determining that the second anomaly score does not exceed the predetermined threshold, the process 600 may proceed to block 624. At block 614, the process 600 may generate a third anomaly score at a third stage of AD. Furthermore, at block 624, in response to determining that the first and/or second anomaly score does not exceed the predetermined threshold, the process 600 may send data of the process chain to train an events collection data analysis process of the analyzer module of the host endpoint agent; and thereafter the process 600 may also proceed to block 616. That is, a combined anomaly score may be generated based on at least one anomaly score being generated such as the first anomaly score; such that even if the generated first, second, and/or third anomaly scores do not exceed a predetermined threshold, those generated anomaly scores may still be combined to generate the combined anomaly score.

At block 616, the process 600 may generate a combined anomaly score. At block 618, the process 600 may additionally (or optionally) compare the combined anomaly score to action benchmark. At block 620, the process 600 may additionally trigger an autonomous response. At block 622, the process 600 may additionally send an event alert to an AI based cyber security platform.

Figure 7:
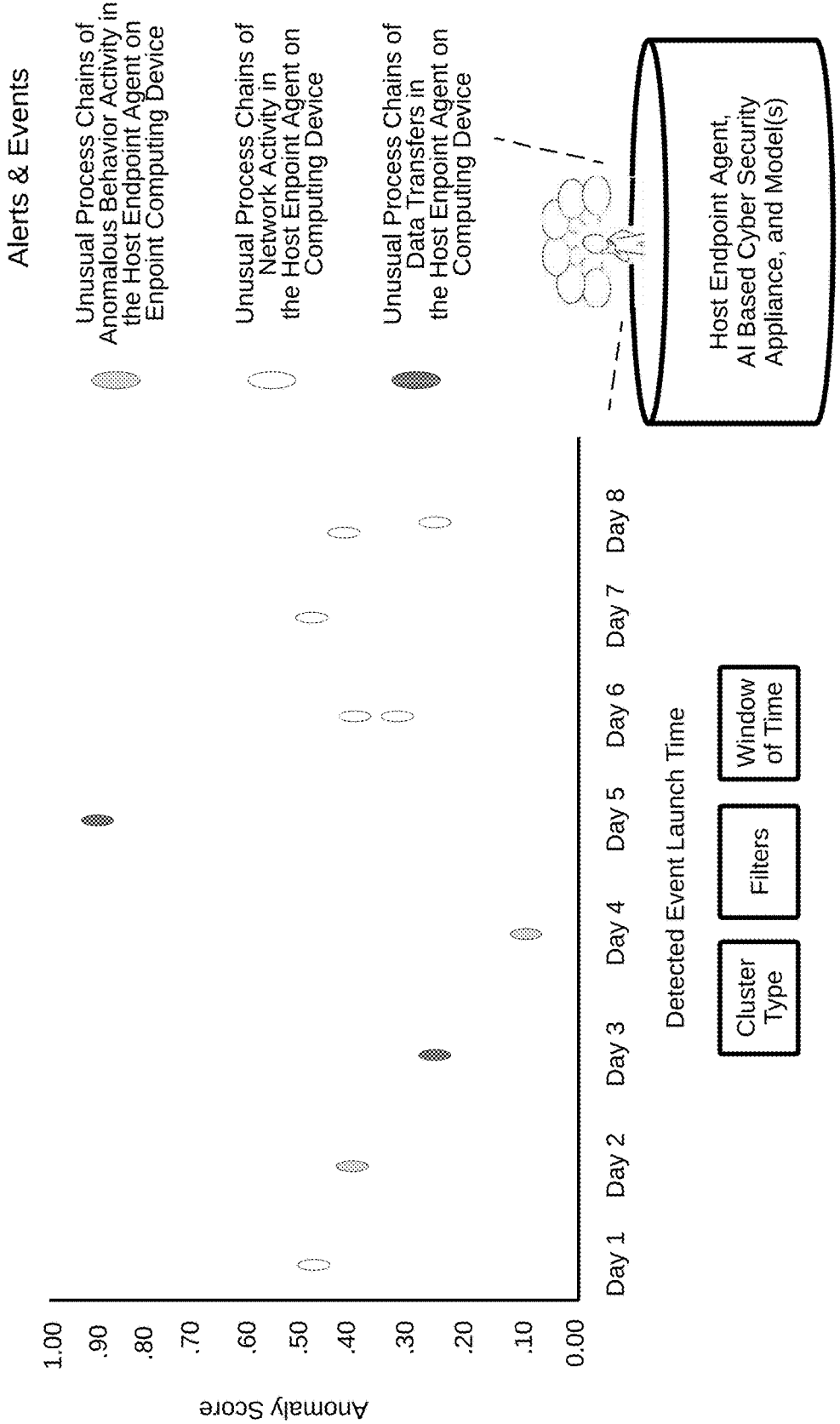
FIG. 7 illustrates a block diagram of a graph depicting events with various anomalous process chains of unusual behaviour in relation to their respective anomaly scores and event launch times, in accordance with an embodiment of the disclosure.

Referring now to FIG. 7, an exemplary graph 700 for depicting events with various anomalous process chains of unusual behaviour in relation to their respective anomaly scores and event launch times is shown, in accordance with an embodiment of the disclosure. The graph 700 may depict a cluster of unusual behaviors detected and analyzed by a host endpoint agent in an AI based cyber security platform, where the cluster of detected unusual behaviors may include, but are not limited to, any of the detected unusual process chains of anomalous activations, network activity, data transfers, and/or any other detectable process chains. For example, the graph 700 may depict one or more different machine learning models (as described above) that are trained to analyze the variety of detected unusual process chains from the collected pattern of life data against the normal pattern of life from the host endpoint agent on the endpoint computing device connected to such AI based cyber security appliance. The host endpoint agent, the endpoint computing device, and the AI based cyber security appliance depicted in FIG. 7 may be substantially similar to the host endpoint agents 101A-D, the endpoint computing devices 202A-D, and the AI based cyber security appliance 120 depicted in FIG. 2.

In some embodiments, the graph 700 may be provided as a user interface used to show a user the cluster of alerts and/or events associated with the variety of detected unusual process chains, which may further include the respective detailed labels of the characteristics of such detected alerts and/or events. As described above, the host endpoint agent may utilize an analyzer module with a multi-stage anomaly detector to analyze and generate in real-time anomaly scores for the detected events. The generated anomaly scores may correlate with more/less interesting and higher/lower level alerts for any potential cyber threats and similarity their likelihood that such detected process chains and behaviors under analysis fall outside of the collected/trained pattern of life of the host endpoint agent on such endpoint computing device—and thereby also provide autonomous responses to protect such device and any other devices within such AI based cyber security platform.

Note that, in these embodiments, the analyzer module in conjunction with the multi-stage anomaly detector may utilize any of the AI models described above to identify any unusual process chain behaviors; and to thereby analyze and determine whether such behaviors correlate to any behaviors known from any previously observed process chains, process chain frequencies, process chain data, etc., via the host endpoint agent on the endpoint computing device—without requiring, for example, any malware signatures and the like from any external AI models. That is, the analyzer module may be configured to provide real-time assessments, alerts, and determinations for any anomalous process chains depicted in the exemplary graph 700 by purely using the pattern of life observed with the host endpoint agent on such endpoint computing device and any other endpoint devices within that host's peer group.

Figure 8:
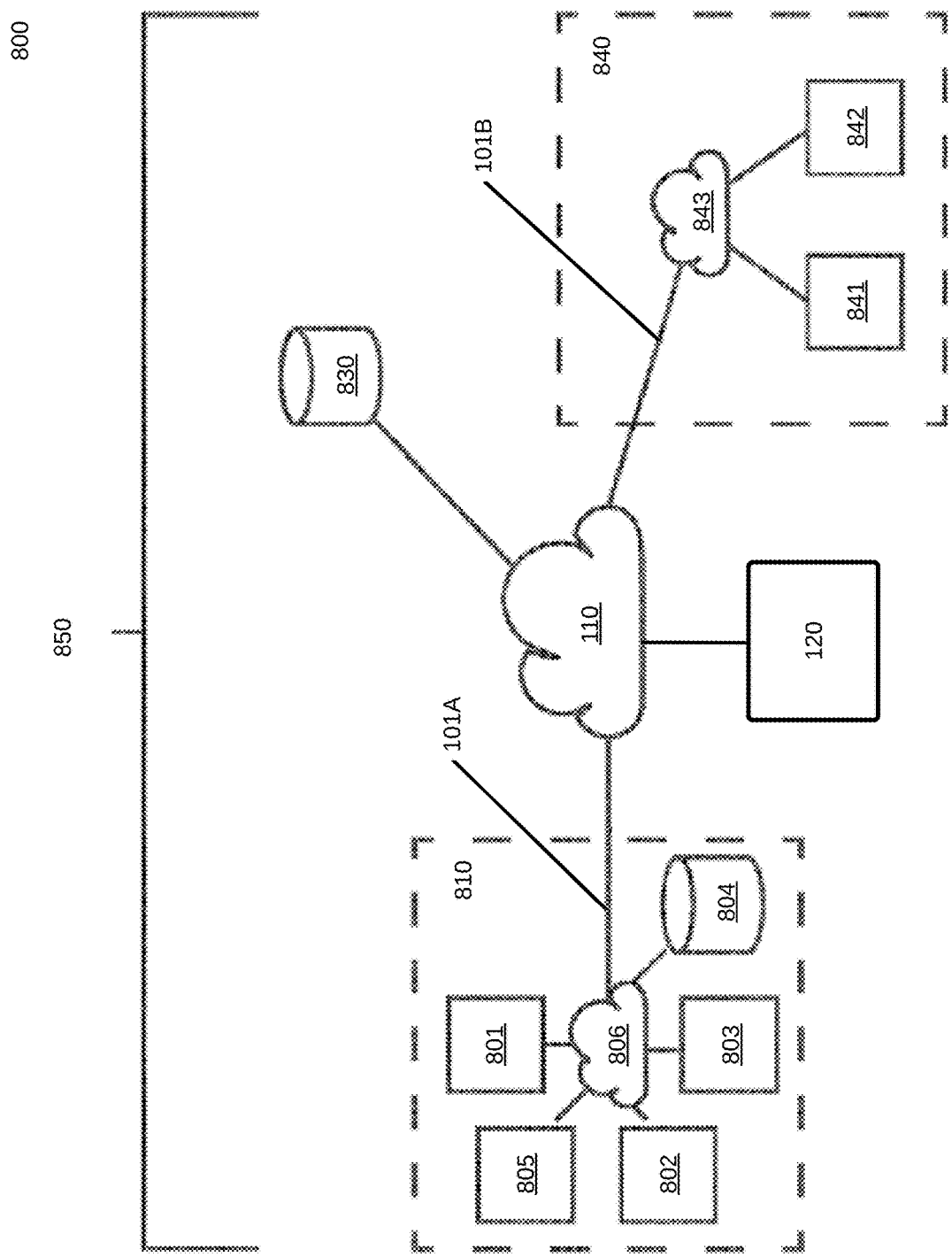
FIG. 8 illustrates a block diagram of an exemplary AI based cyber security system having an AI based cyber security appliance with one or more host endpoint agents that are protecting a network, a database server, and one or more computing devices, in accordance with an embodiment of the disclosure.

Referring now to FIG. 8, an exemplary cyber threat defense system 800 having an AI based cyber threat security appliance 120 with one or more host endpoint agents 101A-B that are protecting a network 110, a database server 830, and one or more computing devices 810 and 840 is shown, in accordance with an embodiment of the disclosure. The cyber threat defense system 800 depicted in FIG. 8 may be similar to the AI based cyber security systems 100 and 200 depicted above in FIGS. 1-2. For example, the cyber threat defense system 800 may configure the AI based cyber security appliance 120 and the one or more host endpoint agents 101A-B to protect the computing devices 810 and 840 communicatively coupled over the network 110.

As shown in FIG. 8, the cyber threat defense system 800 may include a network of computer systems 850 that may be using the AI cyber security appliance 120 and its one or more communicatively coupled host endpoint agents 101A-B. The exemplary system 800 depicted by FIG. 8 may be a simplified illustration, which is provided for ease of explanation of the present disclosure. For example, the network of computer systems 850 may comprise a first computer system 810 within a building, which uses the cyber threat detection system 800 to detect and thereby attempt to prevent threats to computing devices within its bounds. The first computer system 810 may comprise one or more computers 801-803, a local server 804, and a multifunctional device 805 that may provide printing and facsimile functionalities to each of the respective computers 801-803. All of the devices within the first computer system 810 may be communicatively coupled via a first network 806, such as a Local Area Network (LAN) and/or the like. Consequently, all of the computers 801-803 may be able to access the local server 804 via the network 806 and use the functionalities of the multifunctional device 805 via the network 806.

Moreover, the network 806 of the first computer system 810 may be communicatively coupled to the network 110 (e.g., the Internet), which may in turn provide the computers 801-803 with access to a multitude of other computing devices including the database server 830 and the second computer system 840. For example, the second computer system 840 may also include one or more computers 841-842 that may be communicatively coupled to each other via a second network 843 (or a second LAN).

In this exemplary embodiment, the computer 801 on the first computer system 810 may be configured by an AI cyber threat security detection system, such as the system 800 and any of the other AI based systems 100 and 200 depicted above, and therefore runs the necessary AI based threat detection processes for detecting threats in real-time to the first computer system 810. As such, it comprises a processor arranged to run the steps of the processes described herein, memory required to store information related to the running of such processes, as well as a network interface for collecting the required information and so on. This process shall now be described in greater detail below with reference to FIG. 8.

The computer 801 may build and maintain a dynamic, ever-changing model of the 'normal behavior' of each user and machine within the system 810. The approach is based on Bayesian mathematics, and monitors all interactions, events and communications within the system 810—which computer is talking to which, files that have been created, networks that are being accessed, and so on.

For example, the computer 802 may be based in a company's San Francisco office and operated by a marketing employee who regularly accesses the marketing network, usually communicates with machines in the company's U.K. office in second computer system 840 between 9:30 AM and midday and is active from about 8:30 AM until 6 PM. The same employee virtually never accesses the employee time sheets, very rarely connects to the company's Atlanta network and has no dealings in South-East Asia. The AI based cyber threat detection system takes all the information that is available relating to this employee and establishes a 'pattern of life' for that person, which is dynamically updated as more information is gathered. The 'normal' model is used as a moving benchmark, allowing the system to spot behavior on a system that seems to fall outside of this normal pattern of life, and flags this behavior as anomalous, requiring further investigation.

The AI based cyber threat detection system may be built to deal with the fact that today's attackers are getting stealthier and an attacker may be 'hiding' in a system to ensure that they avoid raising suspicion in an end user, such as by slowing their machine down, using normal software protocol. Any attack process thus stops or 'backs off' automatically if the mouse or keyboard is used. However, yet more sophisticated attacks try the opposite, hiding in memory under the guise of a normal process and stealing CPU cycles only when the machine is active, in an attempt to defeat a relatively-simple policing process. These sophisticated attackers look for activity that is not directly associated with the user's input. As an APT (Advanced Persistent Threat) attack typically has very long mission windows of weeks, months or years, such processor cycles may be stolen so infrequently that they do not impact machine performance. But however cloaked and sophisticated the attack is, there will always be a measurable delta, even if extremely slight, in typical machine behavior, between pre and post compromise. This behavioral delta may be observed and acted on with the form of Bayesian mathematical analysis used by the AI based cyber threat security detection system installed on the computer 801.

The AI based cyber threat security/defense self-learning platform may use machine-learning technology. The machine-learning technology, using advanced mathematics, may detect previously unidentified threats, without rules, and automatically defend networks. Note, today's attacks may be of such severity and speed that a human response may not happen quickly enough. Thanks to these self-learning advances, it is now possible for a machine to uncover emerging threats and deploy appropriate, real-time responses to fight back against the most serious cyber threats.

This AI based cyber threat security system may therefore be built and trained to have a sophisticated 'pattern of life'—that understands what represents normality for every person, device, and network activity associated with such host endpoint agent on such device in such system being protected by such AI cyber threat security system.

The AI based cyber threat security system may have the ability to self-learn and detect normality in order to spot true anomalies, allowing organizations of all sizes to understand any unusual behaviors of users, machines, tokens (or symbols, process chains, etc.), and so on, observed within any respective and discrete host device(s) and network(s) at both an individual and group level. Monitoring behaviors, rather than using predefined descriptive objects and/or signatures, means that more attacks may be spotted ahead of time and extremely subtle indicators of wrongdoing may be detected. Unlike traditional legacy defenses, a specific attack type or new malware does not have to have been seen first before it may be detected. A behavioral defense approach mathematically models both machine and human activity behaviorally, at and after the point of compromise, in order to predict and catch today's increasingly sophisticated cyber-attack vectors. It is thus possible to computationally establish what is normal, in order to then detect what is abnormal.

This AI based cyber security system may thus be capable of making value judgments and carrying out higher value, more thoughtful tasks. Machine learning requires complex algorithms to be devised and an overarching framework to interpret the results produced. However, when applied correctly these approaches may facilitate machines to make logical, probability-based decisions and undertake thoughtful tasks.

Advanced machine-learning is at the forefront of the fight against automated and human-driven cyber-threats, overcoming the limitations of rules and signature-based approaches: (i) The machine-learning learns what is normal within a network—it does not depend upon knowledge of previous attacks. (ii) The machine-learning thrives on the scale, complexity and diversity of modern businesses, where every device and person is slightly different. (iii) The machine-learning turns the innovation of attackers against them—any unusual activity is visible. (iv) The machine-learning constantly revisits assumptions about behavior, using probabilistic mathematics. (v) The machine-learning is always up to date and not reliant on human input.

Utilizing machine-learning in cyber security technology is difficult, but when correctly implemented it is extremely powerful. The machine-learning means that previously unidentified threats may be detected, even when their manifestations fail to trigger any rule set or signature. Instead, machine-learning allows the system to analyze large sets of data and learn a 'pattern of life' for what it sees. Machine learning may approximate some human capabilities to machines, such as: (i) thought: it uses past information and insights to form its judgments; (ii) real time: the system processes information as it goes; and (iii) self-improving: the model's machine-learning understanding is constantly being challenged and adapted, based on new information. New unsupervised machine-learning therefore allows computers to recognize evolving threats, without prior warning or supervision.

Note that, in other embodiments, one or more other detectors and data analysis process may be employed as detailed below, without limitations.

Unsupervised Machine Learning

Unsupervised learning works things out without predefined labels. In the case of sorting the series of different animals, the system analyzes the information and works out the different classes of animals. This allows the system to handle the unexpected and embrace uncertainty. The system does not always know what it is looking for, but may independently classify data and detect compelling patterns.

The cyber threat defense system's unsupervised machine learning methods do not require training data with predefined labels. Instead, they are able to identify key patterns and trends in the data, without the need for human input. The advantage of unsupervised learning is that it allows computers to go beyond what their programmers already know and discover previously unknown relationships.

The cyber threat defense system uses unique implementations of unsupervised machine learning algorithms to analyze network data at scale, intelligently handle the unexpected, and embrace uncertainty. Instead of relying on knowledge of past threats to be able to know what to look for, it is able to independently classify data and detect compelling patterns that define what may be considered to be normal behavior. Any new behaviors that deviate from those, which constitute this notion of 'normality,' may indicate threat or compromise. The impact of the cyber threat defense system's unsupervised machine learning on cyber security is transformative: (i) Threats from within, which would otherwise go undetected, may be spotted, highlighted, contextually prioritized and isolated using these algorithms. (ii) The application of machine learning has the potential to provide total network visibility and far greater detection levels, ensuring that networks have an internal defense mechanism. (iii) Machine learning has the capability to learn when to action automatic responses against the most serious cyber threats, disrupting in progress attacks before they become a crisis for the organization.

This new mathematics not only identifies meaningful relationships within data, but also quantifies the uncertainty associated with such inference. By knowing and understanding this uncertainty, it becomes possible to bring together many results within a consistent framework—the basis of Bayesian probabilistic analysis. The mathematics behind machine learning is extremely complex and difficult to get right. Robust, dependable algorithms are developed, with a scalability that enables their successful application to real-world environments.

Overview

In an embodiment, a closer look at the cyber threat defense system's machine learning algorithms and approaches is as follows.

The cyber threat defense system's probabilistic approach to cyber security is based on a Bayesian framework. This allows it to integrate a huge number of weak indicators of potentially anomalous network behavior to produce a single clear measure of how likely a network device is to be compromised. This probabilistic mathematical approach provides an ability to understand important information, amid the noise of the network—even when it does not know what it is looking for.

Ranking Threats

Crucially, the cyber threat defense system's approach accounts for the inevitable ambiguities that exist in data and distinguishes between the subtly differing levels of evidence that different pieces of data may contain. Instead of generating the simple binary outputs 'malicious' or 'benign,' the cyber threat defense system's mathematical algorithms produce outputs that indicate differing degrees of potential compromise. This output enables users of the system to rank different alerts in a rigorous manner and prioritize those that most urgently require action, simultaneously removing the problem of numerous false positives associated with a rule-based approach.

At its core, the cyber threat defense system mathematically characterizes what constitutes 'normal' behavior based on the analysis of a large number/set of different measures of a devices network behavior, examples include at least one or more of: server access; data access; timings of events; credential use; DNS requests; and/or any other similar parameters. Each measure of network behavior is then monitored in real time to detect anomalous behaviors.

Clustering

To be able to properly model what should be considered as normal for a device, its behavior must be analyzed in the context of other similar devices on the network. To accomplish this, the cyber threat defense system leverages the power of unsupervised learning to algorithmically identify naturally occurring groupings of devices, a task which is impossible to do manually on even modestly sized networks.

In order to achieve as holistic a view of the relationships within the network as possible, the cyber threat defense system simultaneously employs a number of different clustering methods including matrix based clustering, density based clustering and hierarchical clustering techniques. The resulting clusters are then used to inform the modeling of the normative behaviors of individual devices. At a glance, clustering: (i) Analyzes behavior in the context of other similar devices on the network; (ii) Algorithms identify naturally occurring groupings of devices—impossible to do manually; and (iii) Simultaneously runs a number of different clustering methods to inform the models.

Network Topology

Any cyber threat detection system must also recognize that a network is far more than the sum of its individual parts, with much of its meaning contained in the relationships among its different entities, and that complex threats may often induce subtle changes in this network structure. To capture such threats, the cyber threat defense system employs several different mathematical methods in order to be able to model multiple facets of a networks topology.

One approach is based on iterative matrix methods that reveal important connectivity structures within the network. In tandem with these, the cyber threat defense system has developed innovative applications of models from the field of statistical physics, which allow the modeling of a network's 'energy landscape' to reveal anomalous substructures that may be concealed within.

Network Structure

A further important challenge in modeling the behaviors of network devices, as well as of networks themselves, is the high-dimensional structure of the problem with the existence of a huge number of potential predictor variables. Observing packet traffic and host activity within an enterprise LAN, WAN and Cloud is difficult because both input and output may contain many inter-related features (protocols, source and destination machines, log changes and rule triggers, etc.). Learning a sparse and consistent structured predictive function is crucial to avoid the curse of over fitting.

In this context, the cyber threat defense system has employed a cutting edge large-scale computational approach to learn sparse structure in models of network behavior and connectivity based on applying L1-regularization techniques (e.g. a lasso method). This allows for the discovery of true associations between different network components and events that may be cast as efficiently solvable convex optimization problems and yield parsimonious models.

Recursive Bayesian Estimation

To combine these multiple analyses of different measures of network behavior to generate a single comprehensive picture of the state of each device, the cyber threat defense system takes advantage of the power of Recursive Bayesian Estimation (RBE) via an implementation of the Bayes filter.

Using RBE, the cyber threat defense system's mathematical models are able to constantly adapt themselves, in a computationally efficient manner, as new information becomes available to the system. They continually recalculate threat levels in the light of new evidence, identifying changing attack behaviors where conventional signature-based methods fall down.

The cyber threat defense system's innovative approach to cyber security has pioneered the use of Bayesian methods for tracking changing device behaviors and computer network structures. The core of the cyber threat defense system's mathematical modeling is the determination of normative behavior, enabled by a sophisticated software platform that allows for its mathematical models to be applied to new network data in real time. The result is a system that is able to identify subtle variations in machine events within a computer networks behavioral history that may indicate cyber-threat or compromise.

The cyber threat defense system uses mathematical analysis and machine learning to detect potential threats, allowing the system to stay ahead of evolving risks. The cyber threat defense system approach means that detection no longer depends on an archive of previous attacks. Instead, attacks may be spotted against the background understanding of what represents normality within a network. No pre-definitions are needed, which allows for the best possible insight and defense against today's threats. On top of the detection capability, the cyber threat defense system may create digital antibodies automatically, as an immediate response to the most threatening cyber breaches. The cyber threat defense system approach both detects and defends against cyber threat. Genuine unsupervised machine learning eliminates the dependence on signature-based approaches to cyber security, which are not working. The cyber threat defense system's technology may become a vital tool for security teams attempting to understand the scale of their network, observe levels of activity, and detect areas of potential weakness. These no longer need to be manually sought out, but are flagged by the automated system and ranked in terms of their significance.

Machine learning technology is the fundamental ally in the defense of systems from the hackers and insider threats of today, and in formulating response to unknown methods of cyber-attack. It is a momentous step change in cyber security. Defense must start within. As such, the threat detection system that has been discussed above therefore implements a propriety form of recursive Bayesian estimation to maintain a distribution over the probability state variable. This distribution is built from the complex set of low-level host, network and traffic observations or 'features'. These features are recorded iteratively and processed in real time on the platform. A plausible representation of the relational information among entities in dynamic systems in general, such as an enterprise network, a living cell or a social community, or indeed the entire internet, is a stochastic network, which is topological rewiring and semantically evolving over time. In many high-dimensional structured I/O problems, such as the observation of packet traffic and host activity within a distributed digital enterprise, where both input and output may contain tens of thousands, sometimes even millions of interrelated features (data transport, host-web-client dialogue, log change and rule trigger, etc.), learning a sparse and consistent structured predictive function is challenged by a lack of normal distribution. To overcome this, the threat detection system consists of a data structure that decides on a rolling continuum rather than a stepwise method in which recurring time cycles such as the working day, shift patterns and other routines are dynamically assigned. Thus, providing a non-frequentist architecture for inferring and testing causal links between explanatory variables, observations and feature sets. This permits an efficiently solvable convex optimization problem and yield parsimonious models. In such an arrangement, the threat detection processing may be triggered by the input of new data. Alternatively, the threat detection processing may be triggered by the absence of expected data. In some arrangements, the processing may be triggered by the presence of a particular actionable event.

The method and system are arranged to be performed by one or more processing components with any portions of software stored in an executable format on a computer readable medium. The computer readable medium may be non-transitory and does not include radio or other carrier waves. The computer readable medium could be, for example, a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

The various methods described above may be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

An apparatus such as a computer may be configured in accordance with such code to perform one or more processes in accordance with the various methods discussed herein.

Web Site

The web site is configured as a browser-based tool or direct cooperating app tool for configuring, analyzing, and communicating with the cyber threat defense system.

Network

A number of electronic systems and devices may communicate with each other in a network environment. The network environment has a communications network. The network may include one or more networks selected from an optical network, a cellular network, the Internet, a Local Area Network ("LAN"), a Wide Area Network ("WAN"), a satellite network, a 3$^{rd}$ party 'cloud' environment; a fiber network, a cable network, and combinations thereof. In some embodiments, the communications network is the Internet. There may be many server computing systems and many client computing systems connected to each other via the communications network.

The communications network may connect one or more server computing systems selected from at least a first server computing system and a second server computing system to each other and to at least one or more client computing systems as well. The server computing systems may each optionally include organized data structures such as databases. Each of the one or more server computing systems may have one or more virtual server computing systems, and multiple virtual server computing systems may be implemented by design. Each of the one or more server computing systems may have one or more firewalls and similar defenses to protect data integrity.

At least one or more client computing systems for example, a mobile computing device (e.g., smartphone with an Android-based operating system may communicate with the server(s). The client computing system may include, for example, the software application or the hardware-based system in which the client computing system may be able to exchange communications with the first electric personal transport vehicle, and/or the second electric personal transport vehicle. Each of the one or more client computing systems may have one or more firewalls and similar defenses to protect data integrity.

A cloud provider platform may include one or more of the server computing systems. A cloud provider may install and operate application software in a cloud (e.g., the network such as the Internet) and cloud users may access the application software from one or more of the client computing systems. Generally, cloud users that have a cloud-based site in the cloud may not solely manage a cloud infrastructure or platform where the application software runs. Thus, the server computing systems and organized data structures thereof may be shared resources, where each cloud user is given a certain amount of dedicated use of the shared resources. Each cloud user's cloud-based site may be given a virtual amount of dedicated space and bandwidth in the cloud. Cloud applications may be different from other applications in their scalability, which may be achieved by cloning tasks onto multiple virtual machines at run-time to meet changing work demand. Load balancers distribute the work over the set of virtual machines. This process is transparent to the cloud user, who sees only a single access point.

Cloud-based remote access may be coded to utilize a protocol, such as Hypertext Transfer Protocol ("HTTP"), to engage in a request and response cycle with an application on a client computing system such as a web-browser application resident on the client computing system. The cloud-based remote access may be accessed by a smartphone, a desktop computer, a tablet, or any other client computing systems, anytime and/or anywhere. The cloud-based remote access is coded to engage in 1) the request and response cycle from all web browser based applications, 3) the request and response cycle from a dedicated on-line server, 4) the request and response cycle directly between a native application resident on a client device and the cloud-based remote access to another client computing system, and 5) combinations of these.

In an embodiment, the server computing system may include a server engine, a web page management component, a content management component, and a database management component. The server engine may perform basic processing and operating-system level tasks. The web page management component may handle creation and display, or routing of web pages or screens associated with receiving and providing digital content and digital advertisements. Users (e.g., cloud users) may access one or more of the server computing systems by means of a Uniform Resource Locator ("URL") associated therewith. The content management component may handle most of the functions in the embodiments described herein. The database management component may include storage and retrieval tasks with respect to the database, queries to the database, and storage of data.

In some embodiments, a server computing system may be configured to display information in a window, a web page, or the like. An application including any program modules, applications, services, processes, and other similar software executable when executed on, for example, the server computing system, may cause the server computing system to display windows and user interface screens in a portion of a display screen space. With respect to a web page, for example, a user via a browser on the client computing system may interact with the web page, and then supply input to the query/fields and/or service presented by the user interface screens. The web page may be served by a web server, for example, the server computing system, on any Hypertext Markup Language ("HTML") or Wireless Access Protocol ("WAP") enabled client computing system (e.g., the client computing system 802B) or any equivalent thereof. The client computing system may host a browser and/or a specific application to interact with the server computing system. Each application has a code scripted to perform the functions that the software component is coded to carry out such as presenting fields to take details of desired information. Algorithms, routines, and engines within, for example, the server computing system may take the information from the presenting fields and put that information into an appropriate storage medium such as a database (e.g., database). A comparison wizard may be scripted to refer to a database and make use of such data. The applications may be hosted on, for example, the server computing system and served to the specific application or browser of, for example, the client computing system. The applications then serve windows or pages that allow entry of details.

Computing Systems

A computing system may be, wholly or partially, part of one or more of the server or client computing devices in accordance with some embodiments. Components of the computing system may include, but are not limited to, a processing unit having one or more processing cores, a system memory, and a system bus that couples various system components including the system memory to the processing unit. The system bus may be any of several types of bus structures selected from a memory bus or memory controller, a peripheral bus, and a local bus using any of a variety of bus architectures.

The computing system typically includes a variety of computing machine-readable media. Computing machine-readable media may be any available media that may be accessed by computing system and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which may be used to store the desired information, and which may be accessed by the computing device 900. Transitory media, such as wireless channels, are not included in the machine-readable media. Communication media typically embody computer readable instructions, data structures, other executable software, or other transport mechanism and includes any information delivery media.

The system memory includes computer storage media in the form of volatile and/or nonvolatile memory such as read only memory (ROM) and random access memory (RAM). A basic input/output system (BIOS) containing the basic routines that help to transfer information between elements within the computing system, such as during start-up, is typically stored in ROM. RAM typically contains data and/or software that are immediately accessible to and/or presently being operated on by the processing unit. By way of example, and not limitation, the RAM may include a portion of the operating system, application programs, other executable software, and program data.

The drives and their associated computer storage media discussed above, provide storage of computer readable instructions, data structures, other executable software and other data for the computing system.

A user may enter commands and information into the computing system through input devices such as a keyboard, touchscreen, or software or hardware input buttons, a microphone, a pointing device and/or scrolling input component, such as a mouse, trackball or touch pad. The microphone may cooperate with speech recognition software. These and other input devices are often connected to the processing unit through a user input interface that is coupled to the system bus, but may be connected by other interface and bus structures, such as a parallel port, game port, or a universal serial bus (USB). A display monitor or other type of display screen device is also connected to the system bus via an interface, such as a display interface. In addition to the monitor, computing devices may also include other peripheral output devices such as speakers, a vibrator, lights, and other output devices, which may be connected through an output peripheral interface.

The computing system may operate in a networked environment using logical connections to one or more remote computers/client devices, such as a remote computing system. The logical connections may include a personal area network ("PAN") (e.g., Bluetooth®), a local area network ("LAN") (e.g., Wi-Fi), and a wide area network ("WAN") (e.g., cellular network), but may also include other networks. Such networking environments are commonplace in offices, enterprise-wide computer networks, intranets and the Internet. A browser application or direct app corresponding with a cloud platform may be resident on the computing device and stored in the memory.

It should be noted that the present design may be carried out on a single computing system and/or on a distributed system in which different portions of the present design are carried out on different parts of the distributed computing system.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as Python, C, C++, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components may be duplicated by software emulation. Thus, a software program written to accomplish those same functions may emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A host endpoint agent configured to detect one or more potential cyber threats on an endpoint computing device, comprising:
an analyzer module in the host endpoint agent, the analyzer module configured to generate one or more anomaly scores for a potential cyber threat detected on the host endpoint agent, wherein the host endpoint agent is configured to reside on the endpoint computing device;
a multi-stage anomaly detector in the analyzer module, wherein the multi-stage anomaly detector includes at least a first stage of anomaly detectors and a second stage of anomaly detectors, wherein each of the first stage of anomaly detectors and the second stage of anomaly detectors is configured to generate an anomaly score from the one or more generated anomaly scores for a process chain of parameters under analysis, wherein the first stage of anomaly detectors comprises a symbol frequency anomaly detector to analyze a first process chain to estimate how often a process associated with the first process chain has been executed on the endpoint computing device and the second stage of anomaly detectors comprises a jump frequency anomaly detector to analyze a second process chain to estimate how often a particular process launches and then accesses or launches another process; and
wherein the anomaly score is correlated to a likelihood that the detected potential cyber threat is maliciously harmful for the endpoint computing device, and when a maliciously harmful cyber threat is detected, then at least a notice is generated to a user of the endpoint computing device.

2. The host endpoint agent of claim 1, wherein a combined anomaly score is determined based on one or more interest-level factors comprising at least one or more of a level of interest factor and an estimation level of severeness factor of an impact of the potential cyber threat could have on the endpoint computing device, and wherein the host endpoint agent is configured to use one or more machine-learning models trained on the endpoint computing device to analyze a collected pattern of life data for the endpoint computing device against a normal pattern of life data for the endpoint computing device to provide the determination of the combined anomaly score for the detected potential cyber threat for that endpoint computing device.

3. The host endpoint agent of claim 2, wherein the level of interest factor is used to indicate how much a behavior pattern of the detected potential cyber threat is different from a normal behavior pattern of life for the endpoint computing device.

4. The host endpoint agent of claim 3, wherein a downstream stage of the multi-stage anomaly detector is merely queried to generate its anomaly score when an anomaly score from an upstream stage of the multi-stage anomaly detector is greater than a threshold amount.

5. The host endpoint agent of claim 1, wherein each of the stages of the anomaly detectors is configured to use one or more computational processes and factors that are different from the one or more computational process used by the other stages of the anomaly detectors, and wherein the one or more different computational processes and factors are implemented by each of the respective stages of the anomaly detectors to ultimately form a weighted combination of the generated anomaly scores.

6. The host endpoint agent of claim 1, wherein the plurality of anomaly detectors further includes a third stage of anomaly detectors, the third stage of anomaly detectors comprises a neural network anomaly detector to analyze two or more details of how a process is interacting with other processes or resources on the endpoint computing device.

7. The host endpoint agent of claim 6, wherein the neural network anomaly detector further comprises a recurrent neural network anomaly detector, wherein the analyzer module comprises a controller having one or more threshold parameters, wherein the threshold parameters comprise one or more urgency parameters are configured as one or more static/dynamic thresholds, and wherein the urgency parameters are configured to govern a time duration for each of the first, second, third stages of the anomaly detectors, and to establish the thresholds in order to move from one anomaly score of such detectors to another anomaly score of such detectors in a hierarchy configuration.

8. The host endpoint agent of claim 7, wherein the first and second anomaly scores of the first and second stages of the anomaly detectors exceed the established thresholds of the urgency parameters to be capable of moving and generating the third anomaly score of the third stage of the anomaly detectors.

9. A host endpoint agent configured to detect one or more potential cyber threats on an endpoint computing device, comprising:
an analyzer module in the host endpoint agent, the analyzer module configured to generate one or more anomaly scores for a potential cyber threat detected on the host endpoint agent, wherein the host endpoint agent is configured to reside on the endpoint computing device;
a multi-stage anomaly detector in the analyzer module, wherein the multi-stage anomaly detector includes a plurality of anomaly detectors including at least a first stage of anomaly detectors and a second stage of anomaly detectors, wherein each of the first stage of anomaly detectors and the second stage of anomaly detectors is configured to generate an anomaly score from the one or more generated anomaly scores for a process chain of parameters under analysis;

a communications module in the host endpoint agent configured to cooperate with the analyzer module and communicate with an application programming interface (API) hosted by a cyber security appliance;

a collections module in the host endpoint agent configured to monitor and collect pattern of life data of multiple software processes executing on the endpoint computing device and one or more users of the endpoint computing device, wherein the communications module and the collections module cooperate to send the pattern of life data, via the communications module, to the cyber security appliance installed on a network communicatively coupled to the endpoint computing device, wherein the cyber security appliance comprises at least one or more machine-learning models to analyze the pattern of life data for each host endpoint agent communicatively coupled to that API hosted by the cyber security appliance, wherein any instructions of these modules are configured to be stored in an executable format in one or more memories and by one or more processors in the endpoint computing device, wherein the collections module is further configured to collect pattern of life data including at least one or more of metadata, events, and alerts; and a cyber threat module is configured in the host endpoint agent or the cyber security appliance to reference one or more machine-learning models trained on the potential cyber threats to analyze any of the potential cyber threats on a respective endpoint computing device based on the collected pattern of life data that deviates from the normal pattern of life data for that endpoint computing device.

10. The host endpoint agent of claim 1, further comprising:

an autonomous response module in the host endpoint agent configured to cause one or more actions to be taken autonomously to contain the detected potential cyber threat, wherein the one or more actions are configured to be triggered with a trigger module in the host endpoint agent when the likelihood of a combined anomaly score is equal to or above a predetermined threshold that indicates a high likelihood that the detected cyber threat is maliciously harmful for the endpoint computing device, wherein the cyber threat module is configured to generate the combined anomaly score based on a real-time analysis of the potential cyber threat on the endpoint computing device in light of the collected pattern of life data that deviates from the normal pattern of life data for that endpoint computing device.

11. A method for detecting one or more potential cyber threats on an endpoint computing device, comprising:

configuring a host endpoint agent to reside on the endpoint computing device, wherein the host endpoint agent is configured to communicate with a cyber security appliance;

training an analyzer module in the host endpoint agent based on one or more machine-learning models trained on the endpoint computing device;

generating one or more anomaly scores for a potential cyber threat detected on the host endpoint agent based on the trained analyzer module, wherein the trained analyzer module includes a multi-stage anomaly detector, wherein the multi-stage anomaly detector includes at least (i) a first stage of anomaly detectors that comprises a symbol frequency anomaly detector to analyze a first process chain to estimate how often a process associated with the first process chain has been executed on the endpoint computing device, and (ii) a second stage of anomaly detectors that comprises a jump frequency anomaly detector to analyze a second process chain to estimate how often a particular process launches and then accesses or launches another process;

generating, by at least the first stage of anomaly detectors and a second stage of anomaly detectors, a particular anomaly score from the one or more generated anomaly scores for a process chain of parameters under analysis; and correlating the anomaly score to a likelihood that the detected potential cyber threat is maliciously harmful for the endpoint computing device, and, when a maliciously harmful cyber threat is detected, then generating at least a notice to a user of the endpoint computing device.

12. The method of claim 11, wherein a combined anomaly score is determined based on one or more interest-level factors comprising at least one or more of a level of interest factor and an estimation level of severeness factor of an impact of the potential cyber threat could have on the endpoint computing device, and wherein the host endpoint agent is configured to use one or more machine-learning models trained on the endpoint computing device to analyze a collected pattern of life data for the endpoint computing device against a normal pattern of life data for the endpoint computing device to provide the determination of the combined anomaly score for the detected potential cyber threat for that endpoint computing device.

13. The method of claim 12, wherein the level of interest factor is used to determine how much a behavior pattern of the detected cyber threat is different from a normal behavior pattern of life for the endpoint computing device.

14. The method of claim 13, wherein a downstream stage of the multi-stage anomaly detector is merely queried to generate its anomaly score when an anomaly score from an upstream stage of the multi-stage anomaly detector is greater than a threshold amount.

15. The method of claim 11, wherein each of the stages of the anomaly detectors is configured to use one or more computational processes and factors that are different from the one or more computational process used by the other stages of the anomaly detectors, and wherein the one or more different computational processes and factors are implemented by each of the respective stages of the anomaly detectors to ultimately form a weighted combination of the generated anomaly scores.

16. The method of claim 11, wherein the multi-stage anomaly detector further comprises a third stage of the anomaly detectors comprises a neural network anomaly detector to analyze two or more details of how a process is interacting with other processes and/or resources on the endpoint computing device.

17. The method of claim 16, wherein the neural network anomaly detector further comprises a recurrent neural network anomaly detector, wherein the analyzer module comprises a controller having one or more threshold parameters, wherein the threshold parameters comprise one or more urgency parameters are configured as one or more static/dynamic thresholds, and wherein the urgency parameters are configured to govern a time duration for each of the first, second, third stages of the anomaly detectors, and to establish the thresholds in order to move from one anomaly score of such detectors to another anomaly score of such detectors in a hierarchy configuration.

18. The method of claim 17, wherein the first and second anomaly scores of the first and second stages of the anomaly detectors exceed the established thresholds of the urgency parameters to be capable of moving and generating the third anomaly score of the third stage of the anomaly detectors.

19. A method for detecting one or more potential cyber threats on an endpoint computing device, comprising:
   configuring a host endpoint agent to reside on the endpoint computing device, wherein the host endpoint agent is configured to communicate with a cyber security appliance;
   training an analyzer module in the host endpoint agent based on one or more machine-learning models trained on the endpoint computing device;
   generating one or more anomaly scores for a potential cyber threat detected on the host endpoint agent based on the trained analyzer module, wherein the trained analyzer module includes a multi-stage anomaly detector, wherein the multi-stage anomaly detector includes at least a first stage of anomaly detectors and a second stage of anomaly detectors;
   generating, by at least the first stage of anomaly detectors and the second stage of anomaly detectors, a particular anomaly score from the one or more generated anomaly scores for a process chain of parameters under analysis; and
   correlating the anomaly score to a likelihood that the detected potential cyber threat is maliciously harmful for the endpoint computing device, and, when a maliciously harmful cyber threat is detected, then generating at least a notice to a user of the endpoint computing device;
   configuring a communications module in the host endpoint agent to cooperate with the trainer analyzer module and communicate with an application programming interface (API) hosted by a cyber security appliance;
   configuring a collections module in the host endpoint agent to monitor and collect pattern of life data of multiple software processes executing on the endpoint computing device and one or more users of the endpoint computing device, wherein the communications module and the collections module cooperate to send the pattern of life data, via the communications module, to the cyber security appliance installed on a network communicatively coupled to the endpoint computing device, wherein the cyber security appliance comprises at least one or more machine-learning models to analyze the pattern of life data for each host endpoint agent communicatively coupled to that API hosted by the cyber security appliance, wherein any instructions of these modules are configured to be stored in an executable format in one or more memories and by one or more processors in the endpoint computing device, wherein the collections module is further configured to collect pattern of life data including at least one or more of metadata, events, and alerts;
   configuring a cyber threat module in the host endpoint agent or the cyber security appliance to reference one or more machine-learning models trained on the potential cyber threats to analyze any of the potential cyber threats on a respective endpoint computing device based on the collected pattern of life data that deviates from the normal pattern of life data for that endpoint computing device; and
   configuring an autonomous response module in the host endpoint agent to cause one or more actions to be taken autonomously to contain the detected potential cyber threat, wherein the one or more actions are configured to be triggered with a trigger module in the host endpoint agent when the likelihood of a combined anomaly score is equal to or above a predetermined threshold that indicates a high likelihood that the detected cyber threat is maliciously harmful for the endpoint computing device, wherein the cyber threat module is configured to generate the combined anomaly score based on a real-time analysis of the potential cyber threat on the endpoint computing device in light of the collected pattern of life data that deviates from the normal pattern of life data for that endpoint computing device.

20. A non-transitory computer readable medium in a host endpoint agent, comprising: one or more computer readable codes operable, when executed by one or more processors in an endpoint computing device, to instruct the host endpoint agent configured to reside on the endpoint computing device to perform the method of claim 11.

21. The host endpoint agent of claim 1, wherein the first stage of the multi-stage anomaly detector utilizes a different amount of time duration in order to produce an anomaly score than another stage of the multi-stage anomaly detector.

22. The method of claim 11, wherein the first stage of the multi-stage anomaly detector utilizes a different amount of time duration in order to produce an anomaly score than another stage of the multi-stage anomaly detector.

* * * * *